(12) United States Patent
Constantinides

(10) Patent No.: US 11,265,687 B2
(45) Date of Patent: Mar. 1, 2022

(54) CREATING AND UTILIZING MAP CHANNELS

(71) Applicant: YouMap, Inc., New York, NY (US)

(72) Inventor: Stephen Constantinides, New York, NY (US)

(*) Notice: Subject to any disclaimer, the term of this patent is extended or adjusted under 35 U.S.C. 154(b) by 353 days.

(21) Appl. No.: 16/172,692

(22) Filed: Oct. 26, 2018

(65) Prior Publication Data

US 2019/0129966 A1 May 2, 2019

Related U.S. Application Data

(63) which is a continuation-in-part of application No. 15/189,691, filed on Jun. 22, 2016, which is a
(Continued)

(51) Int. Cl.
*H04W 4/18* (2009.01)
*G06Q 50/00* (2012.01)
(Continued)

(52) U.S. Cl.
CPC ...... *H04W 4/185* (2013.01); *G06F 16/24578* (2019.01); *G06F 16/29* (2019.01);
(Continued)

(58) Field of Classification Search
None
See application file for complete search history.

(56) References Cited

U.S. PATENT DOCUMENTS

| 8,738,039 B2 | 5/2014 | Forstall et al. |
| 8,788,973 B2 | 7/2014 | Lavigne et al. |

(Continued)

FOREIGN PATENT DOCUMENTS

| KR | 1020160078703 3 A | 7/2016 |
| WO | 2017120660 A1 | 7/2017 |

OTHER PUBLICATIONS

J. A. B. Perera, D. Zhang and M. Lu, "Smart Maps through Semantic Web, Social Media, and Sentiment Analysis," 2015 IEEE International Conference on Information Reuse and Integration, San Francisco, CA, 2015, pp. 49-56, doi: 10.1109/IRI.2015.18. (Year: 2015).*

(Continued)

*Primary Examiner* — Lynda Jasmin
*Assistant Examiner* — Laura Yesildag
(74) *Attorney, Agent, or Firm* — Redbrick IP, P.C.

(57) ABSTRACT

A system and method for displaying portions of a social network. The method can include: receiving, from a client device, a first transmission including a first selection of a first channel including at least a portion of a map, where the first transmission includes a first identification of a selecting user account of the social network, and where the first channel is configured to access a first layer, and where the first layer includes a first set of social media posts; receiving, from the client device, a second transmission including a second selection of a second channel including at least a portion of a map, where the second transmission includes a second identification of the selecting user account of the social network, and where the second channel is configured to access a second layer, and where the second layer includes a second set of social media posts; applying, by a computer processor, a linking operation to link the first channel and the second channel to generate an aggregated channel configured to access the first layer and the second layer; receiving, from the client device, a request for the aggregated channel; and providing, in response to the request, the aggregated channel for display by the client device.

20 Claims, 24 Drawing Sheets

Related U.S. Application Data continuation-in-part of application No. 16/035,380, filed on Jul. 13, 2018, now abandoned, which is a continuation-in-part of application No. 16/036,923, filed on Jul. 16, 2018, now Pat. No. 11,138,217, which is a continuation-in-part of application No. 16/164,624, filed on Oct. 18, 2018, now Pat. No. 10,616,727.

(60) Provisional application No. 62/577,669, filed on Oct. 26, 2017, provisional application No. 62/183,068, filed on Jun. 22, 2015, provisional application No. 62/532,007, filed on Jul. 13, 2017, provisional application No. 62/532,991, filed on Jul. 14, 2017, provisional application No. 62/549,447, filed on Aug. 24, 2017, provisional application No. 62/574,199, filed on Oct. 18, 2017.

(51) Int. Cl.
  *H04W 4/21*    (2018.01)
  *H04W 4/02*    (2018.01)
  *G06F 16/29*   (2019.01)
  *G06F 16/2457* (2019.01)
  *G06F 16/9537* (2019.01)
  *G06F 16/2455* (2019.01)

(52) U.S. Cl.
  CPC ......... *G06F 16/9537* (2019.01); *G06Q 50/01* (2013.01); *H04W 4/025* (2013.01); *H04W 4/21* (2018.02); *H04W 4/02* (2013.01)

(56) References Cited

U.S. PATENT DOCUMENTS

| | | | |
|---|---|---|---|
| 9,183,807 | B2 | 11/2015 | Small et al. |
| 9,509,787 | B2 | 11/2016 | Li |
| 9,613,003 | B1 | 4/2017 | Goodspeed |
| 9,633,695 | B2 | 4/2017 | Axen et al. |
| 9,712,587 | B1 | 7/2017 | Alfishawi et al. |
| 9,715,482 | B1 | 7/2017 | Bjorkegren |
| 10,387,574 | B1 | 8/2019 | Anders et al. |
| 2007/0147654 | A1 | 6/2007 | Clatworthy et al. |
| 2007/0226063 | A1 | 9/2007 | Hanson |
| 2008/0215994 | A1 | 9/2008 | Harrison et al. |
| 2008/0222295 | A1 | 9/2008 | Robinson et al. |
| 2008/0288406 | A1 | 11/2008 | Seguin et al. |
| 2010/0131366 | A1 | 5/2010 | Gibson et al. |
| 2010/0164957 | A1 | 7/2010 | Lindsay et al. |
| 2010/0180029 | A1 | 7/2010 | Fourman |
| 2010/0305855 | A1 | 12/2010 | Dutton et al. |
| 2011/0238755 | A1 | 9/2011 | Khan et al. |
| 2011/0238762 | A1* | 9/2011 | Soni ............... H04L 51/32 709/206 |
| 2011/0238763 | A1 | 9/2011 | Shin et al. |
| 2011/0246910 | A1 | 10/2011 | Moxley et al. |
| 2012/0135784 | A1 | 5/2012 | Lee et al. |
| 2012/0143963 | A1 | 6/2012 | Kennberg et al. |
| 2013/0060873 | A1 | 3/2013 | Gautam et al. |
| 2013/0066963 | A1 | 3/2013 | Odio et al. |
| 2013/0072235 | A1 | 3/2013 | Forstall et al. |
| 2013/0073387 | A1 | 3/2013 | Heath |
| 2013/0073970 | A1 | 3/2013 | Piantino et al. |
| 2013/0080922 | A1 | 3/2013 | Elias et al. |
| 2013/0110631 | A1 | 5/2013 | Mitchell |
| 2013/0139070 | A1 | 5/2013 | Baldwin et al. |
| 2013/0196690 | A1 | 8/2013 | Crowley et al. |
| 2013/0198661 | A1 | 8/2013 | Matas |
| 2013/0201185 | A1 | 8/2013 | Kochi |
| 2013/0232011 | A1 | 9/2013 | Gupta et al. |
| 2013/0242262 | A1 | 9/2013 | Lewis |
| 2013/0321390 | A1 | 12/2013 | Latta et al. |
| 2014/0002442 | A1 | 1/2014 | Lamb et al. |
| 2014/0046591 | A1 | 2/2014 | Boldyrev et al. |
| 2014/0101601 | A1 | 4/2014 | Tang |
| 2014/0181193 | A1 | 6/2014 | Narasimhan |
| 2014/0236882 | A1 | 8/2014 | Rishe |
| 2014/0250200 | A1 | 9/2014 | Geurts et al. |
| 2014/0274564 | A1 | 9/2014 | Greenbaum |
| 2014/0280278 | A1 | 9/2014 | Harris et al. |
| 2014/0359537 | A1 | 9/2014 | Jackobson et al. |
| 2014/0316192 | A1 | 10/2014 | Massimiliano et al. |
| 2014/0316691 | A1 | 10/2014 | Ren et al. |
| 2015/0032766 | A1 | 1/2015 | Greenbaum |
| 2015/0039443 | A1 | 2/2015 | Soon-Shiong |
| 2015/0058255 | A1 | 2/2015 | Cork |
| 2015/0061825 | A1 | 3/2015 | Suzuki et al. |
| 2015/0169142 | A1 | 6/2015 | Longo et al. |
| 2015/0220802 | A1 | 8/2015 | Mazur et al. |
| 2015/0245168 | A1 | 8/2015 | Martin |
| 2015/0262208 | A1 | 9/2015 | Bjontegard |
| 2015/0302651 | A1 | 10/2015 | Shpigelman |
| 2015/0310497 | A1 | 10/2015 | Valin et al. |
| 2015/0325226 | A1 | 11/2015 | Rosedale et al. |
| 2015/0378587 | A1 | 12/2015 | Falaki et al. |
| 2016/0019661 | A1 | 1/2016 | Bouganim et al. |
| 2016/0027329 | A1 | 1/2016 | Jerauld |
| 2016/0029368 | A1 | 1/2016 | Borenstein et al. |
| 2016/0055250 | A1 | 2/2016 | Rush |
| 2016/0080438 | A1 | 3/2016 | Liang |
| 2016/0142894 | A1 | 5/2016 | Papakonstantinou et al. |
| 2016/0169696 | A1 | 6/2016 | Butts et al. |
| 2016/0203223 | A1 | 7/2016 | Hladik, Jr. |
| 2016/0232131 | A1 | 8/2016 | Liu et al. |
| 2017/0109807 | A1 | 4/2017 | Krishnan |
| 2017/0127128 | A1* | 5/2017 | Seger ............... G06F 16/2282 |
| 2017/0134508 | A1 | 5/2017 | Kalis et al. |
| 2017/0139207 | A1 | 5/2017 | Jenabzadeh |
| 2017/0193075 | A1 | 7/2017 | Hegelich et al. |
| 2017/0200296 | A1 | 7/2017 | Jones et al. |
| 2017/0220966 | A1 | 8/2017 | Wang |
| 2017/0270821 | A1 | 9/2017 | Jerauld |
| 2018/0060778 | A1 | 3/2018 | Guo et al. |
| 2018/0121029 | A1 | 5/2018 | Mrad et al. |
| 2018/0293308 | A1 | 10/2018 | Miller et al. |
| 2020/0242182 | A1 | 7/2020 | Gokyigit |

OTHER PUBLICATIONS

I. Cho, R. Wesslen, S. Volkova, W. Ribarsky and W. Dou, "CrystalBall: A Visual Analytic System for Future Event Discovery and Analysis from Social Media Data," 2017 IEEE Conference on Visual Analytics Science and Technology (VAST), 2017, pp. 25-35, doi: 10.1109/VAST.201 7.8585658 (Year: 2017).*

Reality Visualization in Engineering Education, 12th International Conference on Construction Application of Virtual Reality,Taipei, Taiwan, 292-299.

Dias, A., 2009. Technology Enhanced Learning and Augmented Reality: An Application on Multimedia Interactive Books, International Business & Economics Review, vol. 1, n.1.

International Search Report and Written Opinion received in PCT/US18/42169, dated Sep. 24, 2018 (10 pages).

International Search Report and Written Opinion received in PCT/US18/42355, dated Oct. 1, 2018 (10 pages).

Shirazi, A., 2014. Context-Aware Mobile Augmented Reality Visualization in Construction Engineering Education, Electronic Theses and Dissertations, University of Central Florida. Paper 4510.

Specht, M. et al., 2011. Mobile Augmented Reality for Learning: A Case Study. Journal of the Research Center for Educational Technology, 7(1). Retrieved Jan. 18, 2012, from http://www.rcetj.org/index.php/rcetj/article/view/151.

Y. Tian, W. Wei, Q. Li, F. Xu and S. Zhong, "MobiCrowd: Mobile Crowdsourcing on Location-based Social Networks," IEEE INFOCOM 2018—IEEE Conference on Computer Communications, Honolulu, HI, USA, 2018, pp. 2726-2734, doi: 10.1109/INFOCOM.2018.8486433. (Year: 2018).

R. Wang et al., "Taxi Rec: Recommending Road Clusters to Taxi Drivers Using Ranking-Based Extreme Learning Machines," in

(56) References Cited

OTHER PUBLICATIONS

IEEE Transactions on Knowledge and Data Engineering, vol. 30, No. 3, pp. 585-598, Mar. 1, 2018, doi:10.1109/TKDE 2017.2772907. (Year: 2018).

D. Widdows, J. Lucas, M. Tang and W. Wu, "GrabShare: The construction of a realtime ridesharing service," 2017 2nd IEEE International Conference on Intelligent Transportation Engineering (ICITE), 2017, pp. 138-143, doi: 10.1109 ICITE.2017.8056896. (Year: 2017).

* cited by examiner

CREATING AND UTILIZING MAP CHANNELS

CROSS-REFERENCE TO RELATED APPLICATIONS

This application claims the benefit of U.S. Provisional Patent Application Ser. No. 62/577,669, "MAP CHANNEL SYSTEM", filed Oct. 26, 2017, the entire disclosure of which is incorporated by reference herein, in its entirety, for all purposes.

BACKGROUND

Recent advancements in computing technology and Global Navigation Satellite Systems (GNSS) have led to a movement for creating Internet-connected devices associated with their locations. Less expensive hardware has contributed to a trend in which traditional devices that connected via telephony and the Internet (e.g., email) now include location sharing. This has also led to significant technical challenges in the development of client software and services to fully utilize these devices' capabilities.

As the number and type of network-connected computing devices has increased, there has been a fragmentation of content availability and quality among the various platforms. While some platforms provide social networking with friends, they may not provide information on where a particular friend is located. Further, current systems are not configured well to display where friends are located, where posts on a network are made, and where posts associated with locations are made.

Even adding a single letter to map pins, scaling to the considerable quantity of data shown on a social network, such as those even with word limitations, quickly becomes impossible. The information could become incomprehensible and a user may lose the essence of the posted information.

Thus, there is a need in the art for devices and systems that allow users to view posts in a digestible manner. Problems described herein are difficult to solve, and require unobvious solutions—which is the main reason such a social network has not been created. The inventions require the technological developments of today's portable devices including GNSS receivers and various networks, and would not have been possible even a few years ago.

The disclosures herein are not a small leap over the prior art, but rather a technological disruption in the social media space. A complete rethinking was required to produce solutions to the difficult problems presented herein. Creating such a platform made for mobile devices with limited screen space is even more difficult, due to space limitations. This is compounded by the fact that it's difficult to convey contextual and emotional information with few words, and maps typically have little space to convey information. As such, segmenting relevant information in various manners allows users to more easily digest social media posts and other information presented to them.

SUMMARY

In general, in one aspect, embodiments relate to a system for providing location information on a social network. The system can include: a computer processor; and a social mapping module executing on the computer processor and configured to enable the computer processor to: receive, from a client device, a first transmission including a first selection of a first channel including at least a portion of a map, where the first transmission includes a first identification of a selecting user account of the social network, and where the first channel is configured to access a first layer, and where the first layer includes a first set of social media posts; receive, from the client device, a second transmission including a second selection of a second channel including at least a portion of a map, where the second transmission includes a second identification of the selecting user account of the social network, and where the second channel is configured to access a second layer, and where the second layer includes a second set of social media posts; apply, by the computer processor, a linking operation to link the first channel and the second channel to generate an aggregated channel configured to access the first layer and the second layer; receive, from the client device, a request for the aggregated channel; and provide, in response to the request, the aggregated channel for display by the client device.

In general, in one aspect, embodiments relate to a method for displaying portions of a social network. The method can include: receiving, from a client device, a first transmission including a first selection of a first channel including at least a portion of a map, where the first transmission includes a first identification of a selecting user account of the social network, and where the first channel is configured to access a first layer, and where the first layer includes a first set of social media posts; receiving, from the client device, a second transmission including a second selection of a second channel including at least a portion of a map, where the second transmission includes a second identification of the selecting user account of the social network, and where the second channel is configured to access a second layer, and where the second layer includes a second set of social media posts; applying, by a computer processor, a linking operation to link the first channel and the second channel to generate an aggregated channel configured to access the first layer and the second layer; receiving, from the client device, a request for the aggregated channel; and providing, in response to the request, the aggregated channel for display by the client device.

In general, in one aspect, embodiments relate to a non-transitory computer-readable storage medium including a plurality of instructions for providing location information on a social network. The instructions can be configured to execute on at least one computer processor to enable the computer processor to: receive, from a client device, a first transmission including a first selection of a first channel including at least a portion of a map, where the first transmission includes a first identification of a selecting user account of the social network, and where the first channel is configured to access a first layer, and where the first layer includes a first set of social media posts; receive, from the client device, a second transmission including a second selection of a second channel including at least a portion of a map, where the second transmission includes a second identification of the selecting user account of the social network, and where the second channel is configured to access a second layer, and where the second layer includes a second set of social media posts; apply, by the computer processor, a linking operation to link the first channel and the second channel to generate an aggregated channel configured to access the first layer and the second layer; receive, from the client device, a request for the aggregated channel; and provide, in response to the request, the aggregated channel for display by the client device.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1A:
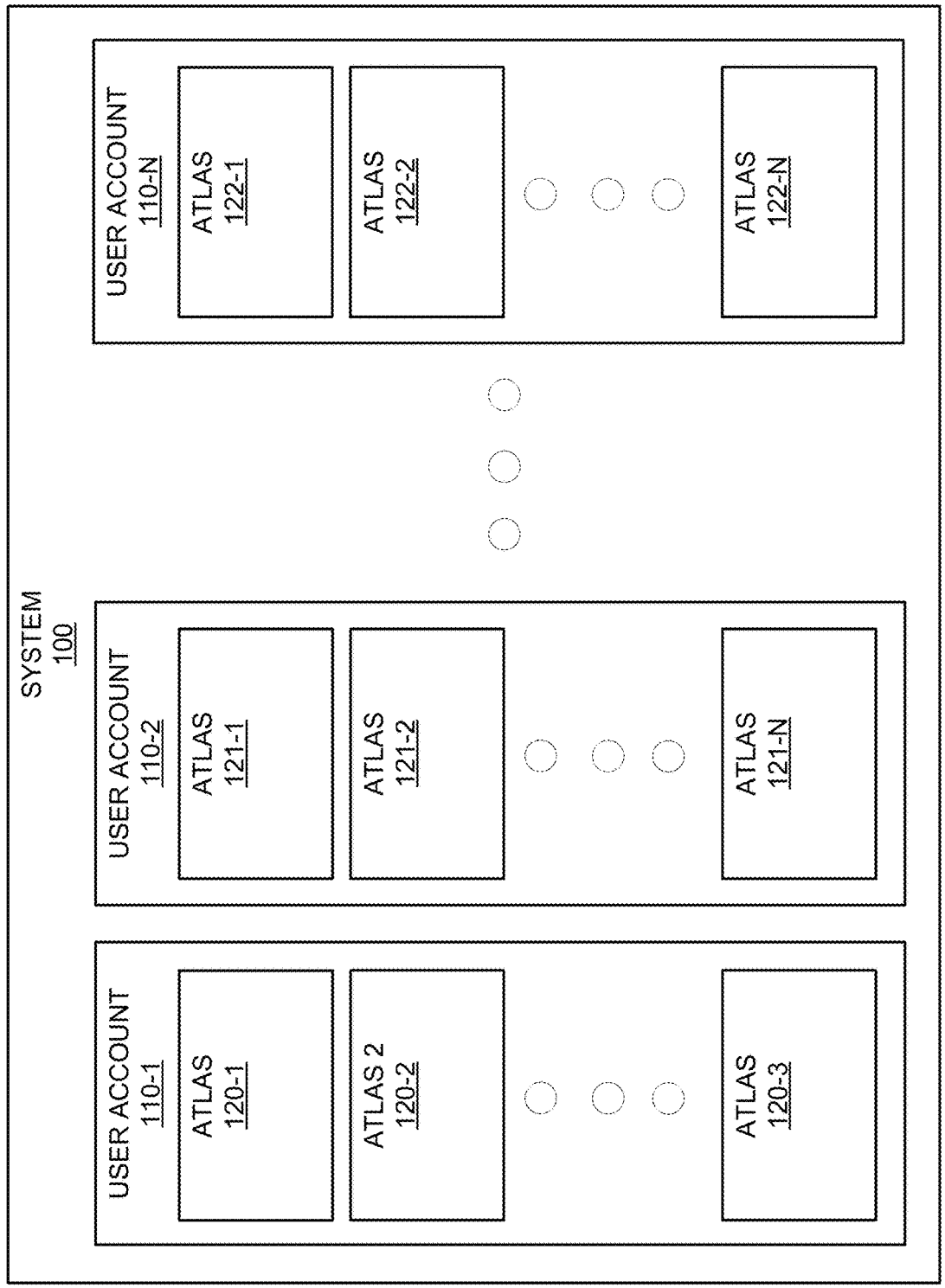
FIGS. 1A-1C illustrate block diagrams of exemplary systems, in accordance with one or more embodiments of the invention.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the present disclosure provide a method and system for aggregating, delivering, and/or creating visualizations of content in a social-media/location-based content platform. As described herein, mobile applications may send and receive content in real time to and from components of the social-media/location-based content platform.

For example, a user may open an application and view social media posts (or posts), which may appear as a symbol and/or text on a map. Posts may also include other media such as images.

Social media networks, as described herein, may utilize a hierarchy to group social media posts. Social media posts may be part of a layer, which is a term used herein to describe a group of social media posts. Next, a layer may be part of a channel, which may include a group of layers. Lastly, a channel may be part of an atlas, which may be a group of channels.

In other words, a social-media system as described herein may comprise a set of user profiles which can each include a set of atlases, each atlas can include a set of channels, each channel can include a set of layers, and each layer can include a set of social media posts.

FIG. 1A illustrates an example system 100. System 100 may include user accounts 110-1, 110-2, and 110-N. It should be understood by one of skill in the art that, in some cases, more user accounts (or atlases, channels, layers, social media posts, and post attributes) than three may exist—which is why element numbers included in FIGS. 1A-1C and 2A-2C may show a first element, a second element, and then an $N^{th}$ element.

User account 110-1 may include atlases 120-1, 120-2, and 120-N; user account 110-2 may include atlases 121-1, 121-2, and 121-N; and user account 110-N may include atlases 122-1, 122-2, and 122-N (e.g., one or more atlases may be assigned to one or more user accounts). In some embodiments, atlases may not be included within user accounts (e.g., an atlas may not be assigned to a specific user account). In other words, in some embodiments atlases may exist in system 100 (e.g., as a data structure), and be accessible by user accounts while not being included in one. In various examples, a user account may access one or more atlases, or may include one or more accesses and/or access one or more atlases it doesn't include that may be included in another user account or may not be included in any user account. In some embodiments, a user account may combine atlases and/or access information included in one or more atlases simultaneously. Further, in some embodiments, various user accounts (e.g., users) may create, edit, modify and/or delete one or more atlases (e.g., via a form) regardless of whether the atlas is included in that user account, included in another user account, combined with another atlas, and/or not included in a user account.

Figure 1B:
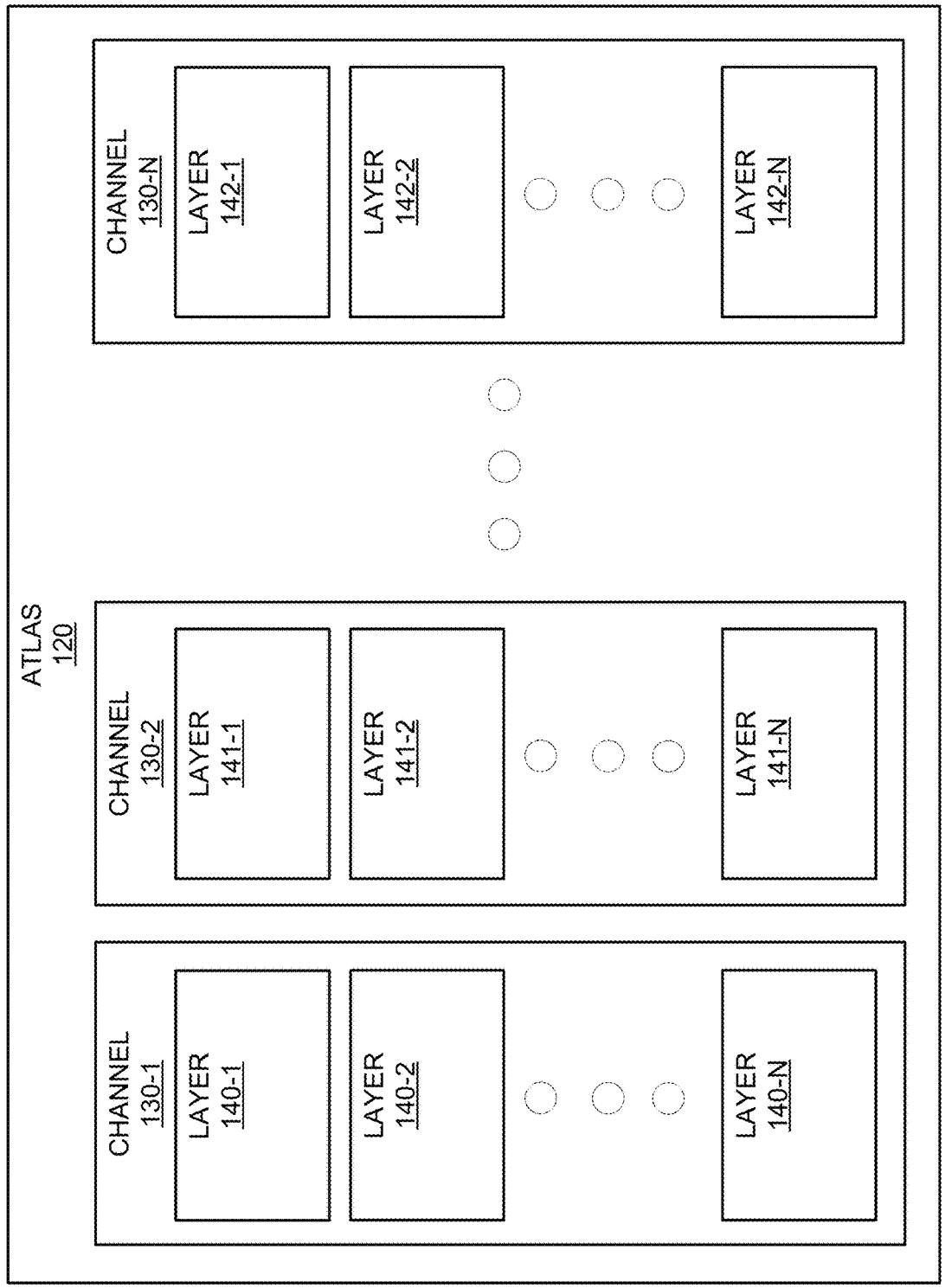

FIG. 1B illustrates an example atlas 120. Atlas 120 may include channels 130-1, 130-2, and 130-N (e.g., one or more channels may be assigned to one or more user accounts and/or channels). In some embodiments, a channel may be referred to as a map, and simply include a map. In some embodiments, channels may not be included within atlases (e.g., a channel may not be assigned to a specific user account and/or atlas). In other words, in some embodiments channels may exist in system 100 (e.g., as a data structure), and be accessible by user accounts, atlases, layers, social media posts, and/or post attributes while not being included in one (e.g., an atlas). In various examples, user accounts, atlases, layers, social media posts, and/or post attributes may access one or more channels, or an atlas may include one or more channels and/or access one or more channels it doesn't include that may be included in another atlas or may not be included in any atlas, user account, etc. In some embodiments, a user account and/or an atlas may combine channels and/or access information included in one or more channels simultaneously. Further, in some embodiments, various user accounts (e.g., users) and/or atlases may create, edit, modify and/or delete one or more channels (e.g., via a form) regardless of whether the channel is included in that user account and/or atlas, included in another user account and/or atlas, combined with another channel, and/or not included in a user account and/or atlas.

Channel 130-1 may include layers 140-1, 140-2, and 140-3; channel 130-2 may include layers 141-1, 141-2, and 141-N; and channel 130-N may include layers 142-1, 142-2, and 142-N (e.g., one or more layers may be assigned to one or more user accounts, atlases, and/or channels). In some embodiments, layers may not be included within user accounts, atlases, and/or channels (e.g., a layer may not be assigned to a specific user account, atlas, and/or channel). In other words, in some embodiments user accounts may exist in system 100 (e.g., as a data structure), and be accessible by user accounts, atlases, channels, social media posts, and/or post attributes while not being included in one (e.g., a channel). In various examples, user accounts, atlases, channels, social media posts, and/or post attributes may access one or more layers, or a channel may include one or more layers and/or access one or more layers it doesn't include that may be included in another channel or may not be included in any channel, atlas, user account, etc. In some embodiments, a user account, atlas, and/or channel may combine layers and/or access information included in one or more layers simultaneously. Further, in some embodiments, various user accounts (e.g., users), atlases, and/or channels may create, edit, modify and/or delete one or more layers (e.g., via a form) regardless of whether the layer is included in that user account, atlas, and/or channel, included in another user account, atlas, and/or channel, combined with another layer, and/or not included in a user account, atlas, and/or channel.

Figure 1C:
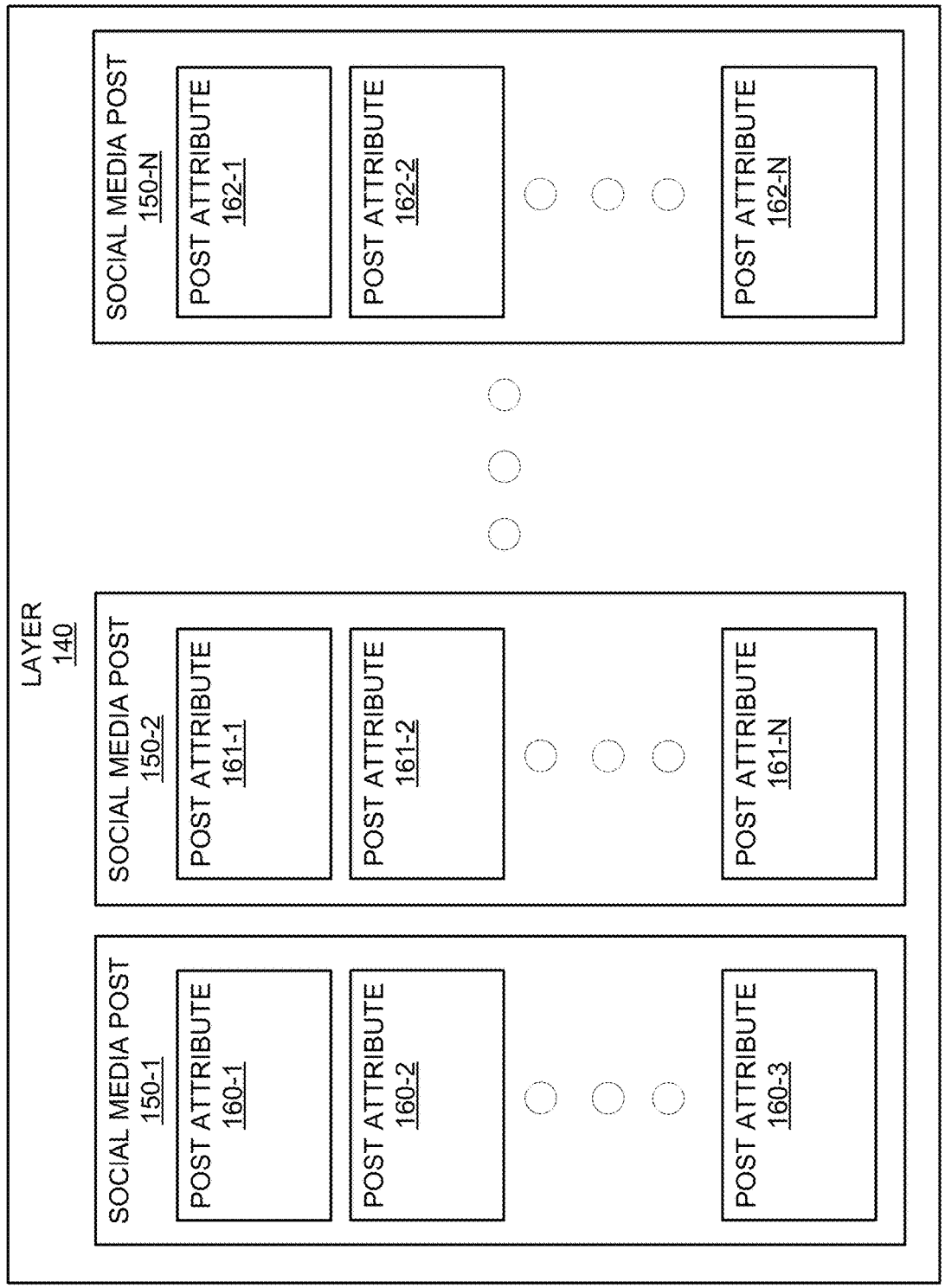

FIG. 1C illustrates an example layer 140. Layer 140 may include social media posts 150-1, 150-2, and 150-N (e.g., one or more social media posts may be assigned to one or more user accounts, atlases, channels, and/or layers). In some embodiments, social media posts may not be included within user accounts, atlases, channels and/or layers (e.g., a social media post may not be assigned to a specific user account, atlas, channel, and/or layer). In other words, in some embodiments social media posts may exist in system 100 (e.g., as a data structure), and be accessible by user accounts, atlases, channels, layers, and/or post attributes while not being included in one (e.g., a layer). In various examples, user accounts, atlases, channels, layers, and/or post attributes may access one or more social media posts, or a layer may include one or more social media posts and/or access one or more social media posts it doesn't include that may be included in another layer or may not be included in any layer, channel, atlas, user account, etc. In some embodiments, a user account, atlas, channel, and/or layer may combine social media posts and/or access information included in one or more social media posts simultaneously. Further, in some embodiments, various user accounts (e.g., users), atlases, channels, and/or layers may create, edit, modify and/or delete one or more social media posts (e.g., via a form) regardless of whether the social media post is included in that user account, atlas, channel, and/or layer, included in another user account, atlas, channel, and/or layer, combined with another social media post, and/or not included in a user account, atlas, channel, and/or layer.

Social media post 150-1 may include post attributes 160-1, 160-2, and 160-3; social media post 150-2 may include post attributes 161-1, 161-2, and 161-N; and social media post 150-N may include post attributes 162-1, 162-2, and 162-N (e.g., one or more post attributes may be assigned to one or more user accounts, atlases, channels, layers, and/or social media accounts). A post attribute may include, but is not limited to: text, an image, a video, a symbol, an emoji, a form, a button, a slide bar, a link, a document, an embedded image, an embedded video, audio, and information associated with a user profile, atlas, channel, layer, and/or social media post. In some embodiments, post attributes may not be included within social media posts, atlases, channels and/or layers (e.g., a post attribute may not be assigned to a specific user account, atlas, channel, layer, and/or social media post). In other words, in some embodiments post attributes may exist in system 100 (e.g., as a data structure), and be accessible by user accounts, atlases, channels, layers, and/or social media posts while not being included in one (e.g., a social media post). In various examples, user accounts, atlases, channels, layers, and/or social media posts may access one or more post attributes, or a social media post may include one or more post attributes and/or access one or more post attributes it doesn't include that may be included in another social media post or may not be included in any social media post, layer, channel, atlas, user account, etc. In some embodiments, a user account, atlas, channel, layer, and/or social media post may combine post attributes and/or access information included in one or more post attributes simultaneously. Further, in some embodiments, various user accounts (e.g., users), atlases, channels, layers and/or social media posts may create, edit, modify and/or delete one or more post attributes (e.g., via a form) regardless of whether the post attribute is included in that user account, atlas, channel, layer and/or social media post, included in another user account, atlas, channel, layer and/or social media post, combined with another post attribute, and/or not included in a user account, atlas, channel, layer, and/or social media post.

In some embodiments, any one or more user accounts, atlases, channels, layers, social media posts, and/or post attributes may create, edit, modify, and/or delete any other one or more user accounts, atlases, channels, layers, social media posts, and/or post attributes. For example, any user may be able to edit a channel, wherein the channel does not belong to any one user. In another example, any user may edit a social media post, wherein the social media post belongs to one or more users. In some embodiments, users (e.g., user accounts) may have different privilege levels (e.g., a user account may be an administrator of one or more atlas, channel, layer social media post and/or post attribute). Based on a user accounts privilege level, it may be able to add, edit, and/or delete one or more user accounts, atlases, channels, layers, social media posts, and/or post attributes, whereas a user account with a different privilege level (e.g., a lower level) may only be able to perform a subset or none of the operations (add, edit, and/or delete, for example).

The difference between a system, a user account, an atlas, a channel, a layer, a social media post, and a post attribute will be discussed below.

As described above, a user may access a social-media/location-based content platform using their mobile device.

In various embodiments, systems described herein may be partially social-media-type networks (e.g., wherein a user is connected to one or more first-level users, second-level users, third-level users, etc., as with Facebook™, LinkedIn™ Snapchat™, or Quora™). A user (also referred to as a user profile) may be connected to some users, while not connected to others. If a user is connected to a user, that connection is considered a first-level connection. Regardless of whether a user is a first-level connection with another user or not, in various embodiments the user may access atlases, channels, layers, social media posts, and post attributes belonging to another user. In some embodiments, content from third party sources (e.g., Facebook™, Google™, Twitter™, Yelp™, another user) may be included in an atlas, channel, layer, social media post, and/or post attribute created by one or more users. In some embodiments, users may interact (e.g., call, chat) with other users by accessing one or more atlases, channels, layers, social media posts, and/or post attributes. For example, two users may chat with each other if they are accessing the same channel.

Figure 2A:
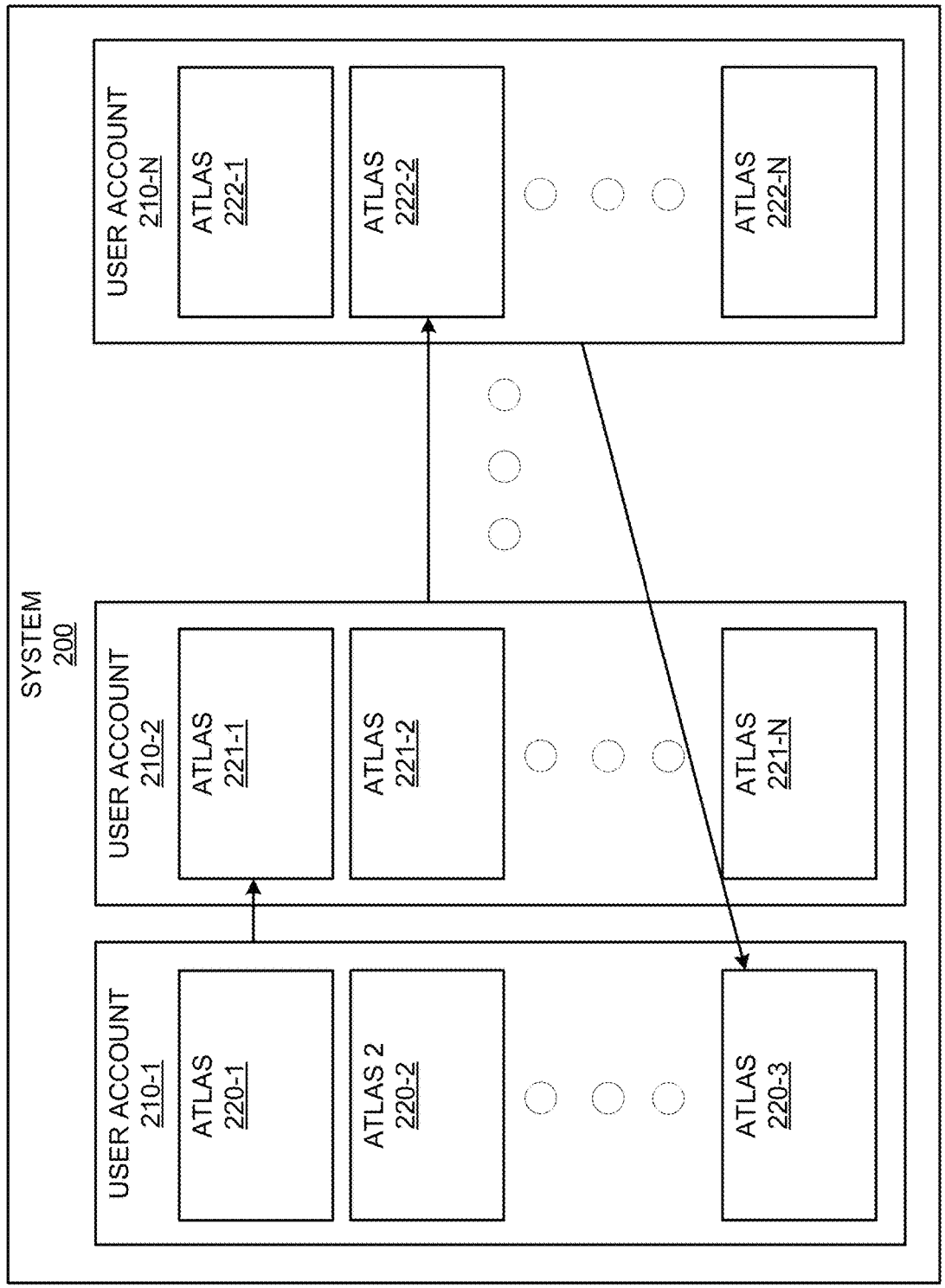
FIGS. 2A-2C illustrate block diagrams of exemplary systems, in accordance with one or more embodiments of the invention.

FIG. 2A illustrates system 200. System 200 may include user accounts 210-1, 210-2, and 210-N.

User account 210-1 may include atlases 220-1, 220-2, and 220-N; user account 210-2 may include atlases 221-1, 221-2, and 221-N; and user account 210-N may include atlases 222-1, 222-2, and 222-N.

As shown in FIG. 2A, in some embodiments, various user accounts may access atlases included in other user accounts. For instance, as shown in FIG. 2A, user account 210-1 may access atlas 221-1, user account 210-2 may access atlas 222-2, and user account 210-N may access atlas 220-N. In some embodiments, user profiles may access other user profiles (e.g., link to them (statically and/or dynamically), include information included in them), and atlases may access other atlases (e.g., link to them (statically and/or dynamically), include information included in them).

Although not shown, it should be understood that atlases may access channels included in other atlases in a similar manner that user accounts may access atlases included in other user accounts.

Figure 2B:
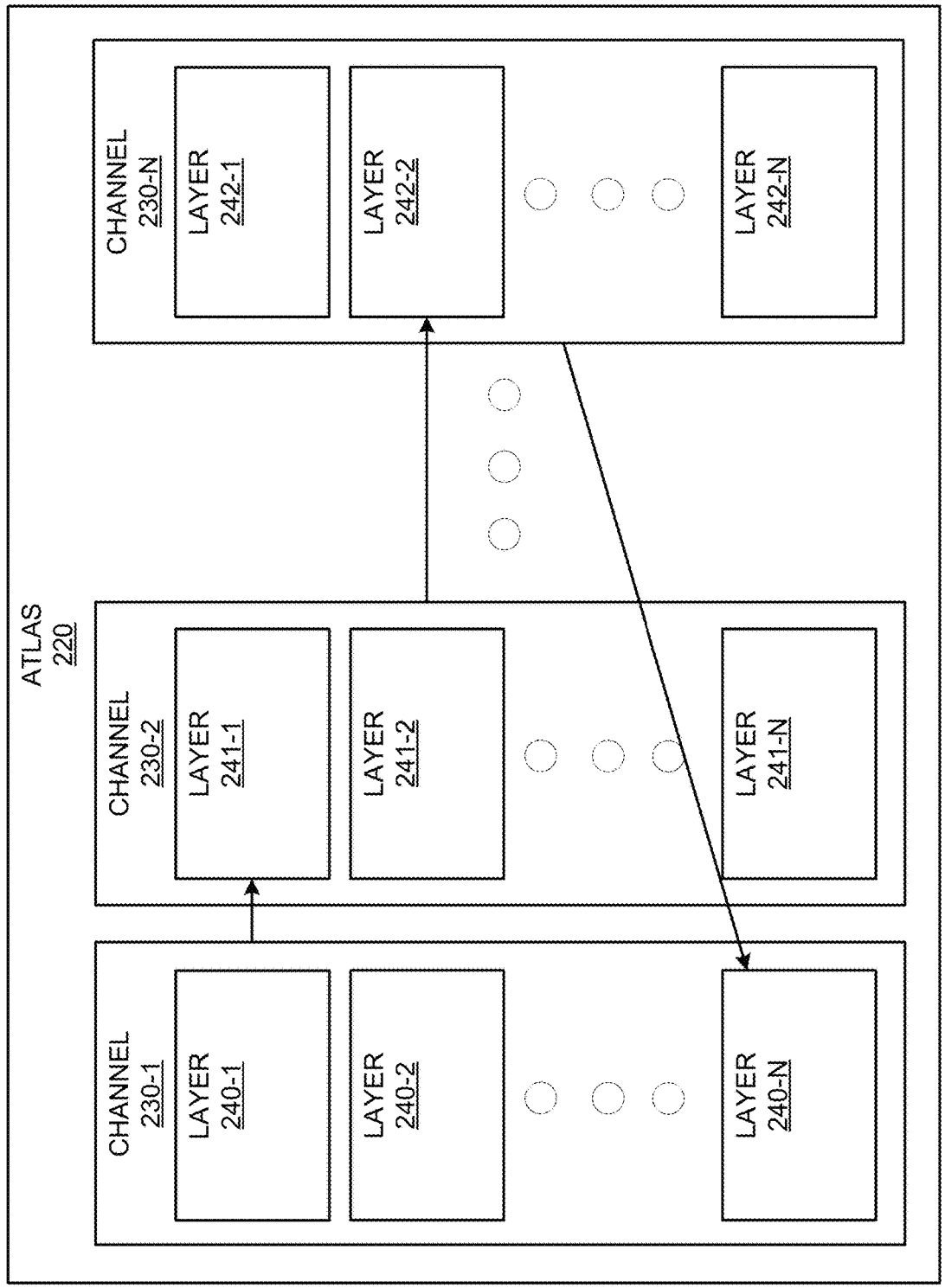

FIG. 2B illustrates atlas 220. Atlas 220 may include channels 230-1, 230-2, and 230-N.

Channel 230-1 may include layers 240-1, 240-2, and 240-N; channel 230-2 may include layers 241-1, 241-2, and 241-N; and channel 230-N may include layers 242-1, 242-2, and 242-N.

As shown in FIG. 2B, in some embodiments, various channels may access layers included in other channels. For instance, as shown in FIG. 2B, channel 230-1 may access layer 241-1, channel 230-2 may access layer 242-2, and channel 230-N may access layer 240-N. In some embodiments, channels may access other channels (e.g., link to them (statically and/or dynamically), include information included in them), and layers may access other layers (e.g., link to them (statically and/or dynamically), include information included in them).

Although not shown, it should be understood that layers may access social media posts included in other layers in a similar manner that channels may access layers in other channels.

Figure 2C:
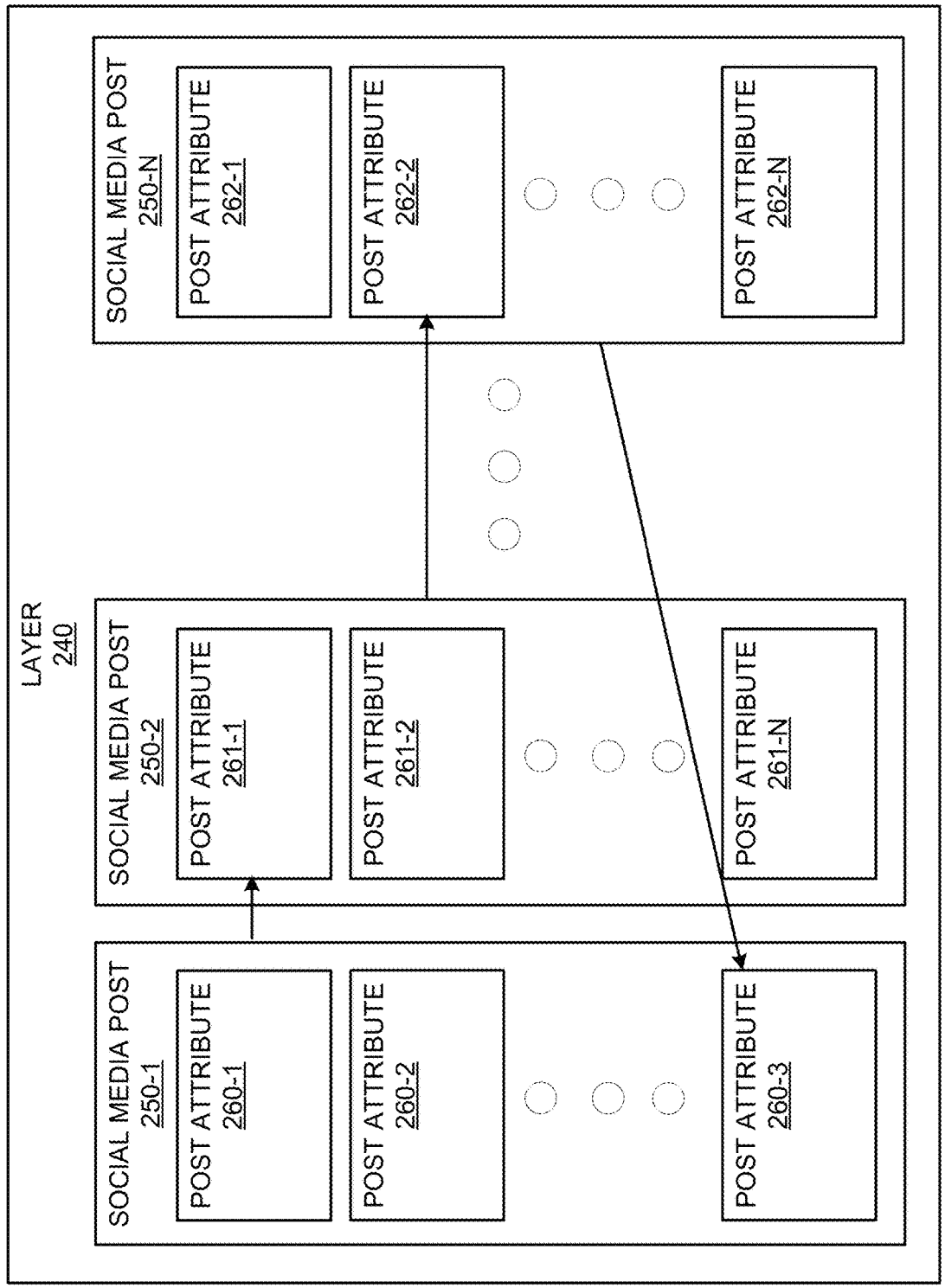

FIG. 2C illustrates layer 240. Layer 240 may include Social Media Posts 250-1, 250-2, and 250-N.

Social media post 250-1 may include post attributes 260-1, 260-2, and 260-N; social media post 250-2 may include post attributes 261-1, 261-2, and 261-N; and social media post 250-N may include post attributes 262-1, 262-2, and 262-N.

As shown in FIG. 2C, in some embodiments, various social media posts may access post attributes included in other social media posts. For instance, as shown in FIG. 2C, social media post 250-1 may access post attribute 261-1, social media post 250-2 may access post attribute 262-2, and social media post 250-N may access post attribute 260-N. In some embodiments, social media posts may access other social media posts (e.g., link to them (statically and/or dynamically), include information included in them), and post attributes may access other post attributes (e.g., link to them (statically and/or dynamically), include information included in them).

In some embodiments, maps, social media posts (or symbols representing social media posts), locations corresponding to social media posts, and post attributes may be displayed on a client device based on attributes of and/or information included in one or more user profiles, atlases, channels, and/or layers. In some embodiments, a linked list may be used to store such information.

Accordingly, a first user account may access a post attribute belonging to a second user, which may be accessed by a post belonging to a third user, which may be accessed by a layer belonging to a fourth user, which may be accessed by a channel belonging to a fifth user, which may be accessed by an atlas belonging to a sixth user. Further, the atlas belonging to the sixth user may be accessed by the first user.

As one example, a user account belonging to Adam may want to determine a time that a Japanese restaurant is open and display that information on his client device. To obtain that information, a system may cause one of Adam's atlases (e.g., Adam's New York atlas) to access one of Adam's channels (e.g., Adam's New York Food channel), which may access one of Adam's layers (e.g., Adam's New York Japanese Food layer), which may access one of Adam's social media posts (e.g., Adam's New York Japanese Food Nobu Sushi social media post layer), which may access one of Adam's post attributes (e.g., Adam's New York Japanese Food Nobu Sushi Hours post attribute). Here, Adam's post attributes (e.g., Adam's New York Japanese Food Nobu Sushi Hours post attribute) may be accessed to retrieve the hours of the Japanese restaurant Nobu Sushi in New York, which may be displayed on Adam's client device (e.g., as text and/or a symbol on a map).

As one example, Adam may want to determine a time that a Mexican restaurant is open and display that information on his client device. To obtain that information, a system may cause Adam's user account to access one of Betty's atlases (e.g., Betty's California atlas), which may access one of Carlos's channels (e.g., Carlos's California Food channel), which may access one of Daniel's layers (e.g., Daniel's California Mexican Food layer), which may access one of Elliot's social media posts (e.g., Elliot's California Mexican Food Tico's Tacos social media post layer), which may access one of Fred's post attributes (e.g., Fred's California Mexican Food Tico's Tacos Hours post attribute). Here, Fred's post attributes (e.g., Fred's California Mexican Food Tico's Tacos Hours post attribute) may be accessed to retrieve the hours of the Mexican restaurant Tico's Tacos, which may be displayed on Adam's client device (e.g., as text and/or a symbol on a map).

As one example, Adam may want to view all Korean restaurants in Chicago on a map. In this example:

(1) Adam's user account may access Betty and Carlos's atlases (e.g., Betty's Chicago atlas and Carlos's Chicago atlas);

(2) Betty's Chicago atlas may access Daniel and Elliot's channels (e.g., Daniel's Chicago Food channel and Elliot's Chicago Food channel), and Carlos's Chicago atlas may access Fred and George's channels (e.g., Fred's Chicago Food channel and George's Chicago Food channel);

(3) Daniel's Chicago Food channel may access Henry and Isaac's layers (e.g., Henry's Chicago Korean Food layer and Isaac's Chicago Korean Food layer), Elliot's Chicago Food channel may access John and Katherine's layers (e.g., John's Chicago Korean Food layer and Katherine's Chicago Korean Food layer), Fred's Chicago Food channel may access Louis and Manny's layers (e.g., Louis's Chicago Korean Food layer and Manny's Chicago Korean Food layer), and George's Chicago Food channel may access Nathan and Owen's layers (e.g., Nathan's Chicago Korean Food layer and Owen's Chicago Korean Food layer); and (4) Henry's Chicago Korean Food layer may access Paul and Quincy's social media posts (e.g., Paul's Chicago Korean Food Burnt Rice Restaurant social media post and Quincy's Chicago Korean Food Q Pot Restaurant social media post), Isaac's Chicago Korean Food layer may access Robert and Steve's social media posts (e.g., Robert's Chicago Korean Food Hanul Restaurant social media post and Steve's Chicago Korean Food To Bang Restaurant social media post), John's Chicago Korean Food layer may access Thomas and Ulysses' social media posts (e.g., Robert's Chicago Korean Food Enjoy Seoul Restaurant social media post and Steve's Chicago Korean Food Gen Korean Restaurant social media post), Katherine's Chicago Korean Food layer may access Vivian and Wendy's social media posts (e.g., Vivian's Chicago Korean Food Heart of Seoul Restaurant social media post and Wendy's Chicago Korean Food Tofu House Restaurant social media post), Louis's Chicago Korean Food layer may access Yolanda and Zeus's social media posts (e.g., Yolanda's Chicago Korean Food Danbi Korean Food Restaurant social media post and Wendy's Chicago Korean Food Korean BBQ Restaurant social media post), Manny's Chicago Korean Food layer may access Ariel and Barnaby's social media posts (e.g., Ariel's Chicago Korean Food Korean Kitchen Restaurant social media post and Barnaby's Chicago Korean Food Yummy Tofu Restaurant social media post), Nathan's Chicago Korean Food layer may access Charlie and Debra's social media posts (e.g., Charlie's Chicago Korean Food Omagari Restaurant social media post and Debra's Chicago Korean Food YakiniQ Restaurant social media post), and Owen's Chicago Korean Food layer may access Ezekiel and Frank's social media posts (e.g., Ezekiel's Chicago Korean Food Beque Korean Grill Restaurant social media post and Frank's Chicago Korean Food K zzang Restaurant social media post). Here, Paul, Quincy, Robert, Steve, Thomas, Ulysses, Vivian, Wendy, Yolanda, Zeus, Ariel, Barnaby, Charlie, Debra, Ezekial, and Frank's social media posts may be accessed to show Burnt Rice Restaurant, Q Pot Restaurant, Hanul Restaurant, To Bang Restaurant, Enjoy Seoul Restaurant, Gen Korean Restaurant, Heart of Seoul Restaurant, Tofu House Restaurant, Danbi Korean Food Restaurant, Korean BBQ Restaurant, Korean Kitchen Restaurant, Yummy Tofu Restaurant, Omagari Restaurant, YakiniQ Restaurant, Beque Korean Grill Restaurant, and K zzang Restaurant on a map on Adam's client device (e.g., as text and/or a symbol on a map).

Accordingly, as should be understood by one skilled in the art, various modules included in one module of a system can access various modules included in another module of a system (which may include hundreds, thousands, millions, and/or billions of modules). Moreover, various modules can access third party sources (e.g., Twitter™, Instagram™) and categorize them as and/or include them in atlases, channels, and/or layers and display received information along with other social media posts and/or post attributes. Moreover, various social media posts may be considered structured herein, whereas other social media networks (regardless of including a map or not) typically include posts that are not structured.

As described throughout the instant disclosure, a user may be able to curate their own maps using atlases, channels, layers, social media posts, and/or post attributes. For example, a user may create a plurality of atlases, channels, layers, social media posts, and/or post attributes which may, or may not, be combined to sus out venues and/or activities they may not have otherwise known about.

In one example, a user can create an atlas, channel, and/or layer associated with Japanese culture. At the same time, that user may have an atlas, channel, and/or layer for bars, or even karaoke bars. In such a case, a system may be configured to receive input that causes atlases, channels, and/or layers to interact with each other (e.g., determine an activity/location that the two atlases, channels, and/or layers have in common). In the example described above, a user causes a device to combine Japanese Culture and Karaoke bars, in which case a map may show a user various Karaoke bars around a city. In some embodiments, a user may have a third atlas, channel, and/or layer or more, which may indicate that a user is interested in private places, or after-hour clubs. In such a case, a system may further filter out Karaoke bars that are not open late or that are too busy.

In other words, in various embodiments, atlases, channels, layers, social media posts, and/or post attributes allow users to curate and/or moderate topical social maps (e.g., embodiments described herein allow users to create atlases, channels, layers, social media posts, and/or post attributes that are associated with a social network associated with map visualizations). Atlases, channels, layers, social media posts, and/or post attributes described herein can be created for any purpose or need. For example, atlases, channels, layers, social media posts, and/or post attributes may cause the creation of a map (e.g., cause a portion of land to be shown) with one or more social media posts overlaying land on a map. The social media posts overlaying portions of a map may be determined by attributes of one or more atlases, channels, layers, social media posts, and/or post attributes.

In one example, (1) an first atlas, channel, and/or layer may include posts indicating locations of Mexican restaurants, (2) a second atlas, channel, and/or layer may include any/all/some social media posts made by first-level connections of a user account in a social network, and (3) a third an atlas, channel, and/or layer may include posts indicating any/all/some locations open before 9:00 a.m.

In various embodiments described herein, a user may select the first, second, and third atlases, channels, and/or layers, and see only social media posts made by first-level connections indicating locations of Mexican restaurants that are open before 9:00 a.m. In some embodiments, these atlases, channels, and/or layers may be automatically applied (e.g., a set of social media posts (or a representation thereof) based on these atlases, channels, and/or layers may be displayed) when a user opens an application and/or map, and a user may simply add additional atlases, channels, and/or layers to filter out (or include more) social media posts, such as restaurants that serve alcohol before 9:00 a.m.

By adding one atlas, channel, and/or layer onto another, a user may be able to predetermine their perfect day/night/excursion based on a variety of attributes described herein such as whether a user's group of friends are moving from one late night Karaoke bar to another. In addition to friends, a type of community, a history of an area or community, the amount of followers a user account has that is making posts, an age of a person that is making posts (e.g., under 21), may all correspond to one or more atlases, channels, and/or layers and/or may contribute to a value associated with a venue, location, party, activity, sporting event, etc.

In some embodiments, atlases, channels, and/or layers may be configured to narrow social media posts (e.g., by including posts that are included in more than one selected atlas, channel, and/or layer). In some embodiments, atlases, channels, and/or layers may be configured to expand an amount of posts shown (e.g., by including posts included within each selected atlas, channel, and/or layer as well as posts that are only in one selected atlas, channel, and/or layer).

For example, a user may select a few channels—one that includes resort attractions, one that includes wild animals, and one that includes zip-lining. A map may show items included in all of these channels (e.g., the map would show resort attractions that include wild animals and zip-lining). In addition, a user may select a channel that includes all locations that include video-game arcades. In various embodiments, a user may configure systems herein to show a map that includes both the locations of resort attractions that include wild animals and zip-lining, as well as locations of any video-game arcades. In such an example, a user may decide to visit the resort attraction that includes wild animals and zip-lining, but is also close to a video-game arcade so their son or someone who would rather play video games than go zip-lining may play, while being close to the group that wants to zipline.

In some embodiments, systems and/or methods described with reference to FIGS. 1A-1C and 2A-2C can be executed by, used on, used by, included in, shown/displayed on, stored in, searched by, transmitted by, assessed by, and/or received by the systems and/or devices included in FIGS. 9A-B, 10, and 11.

Figure 3A:
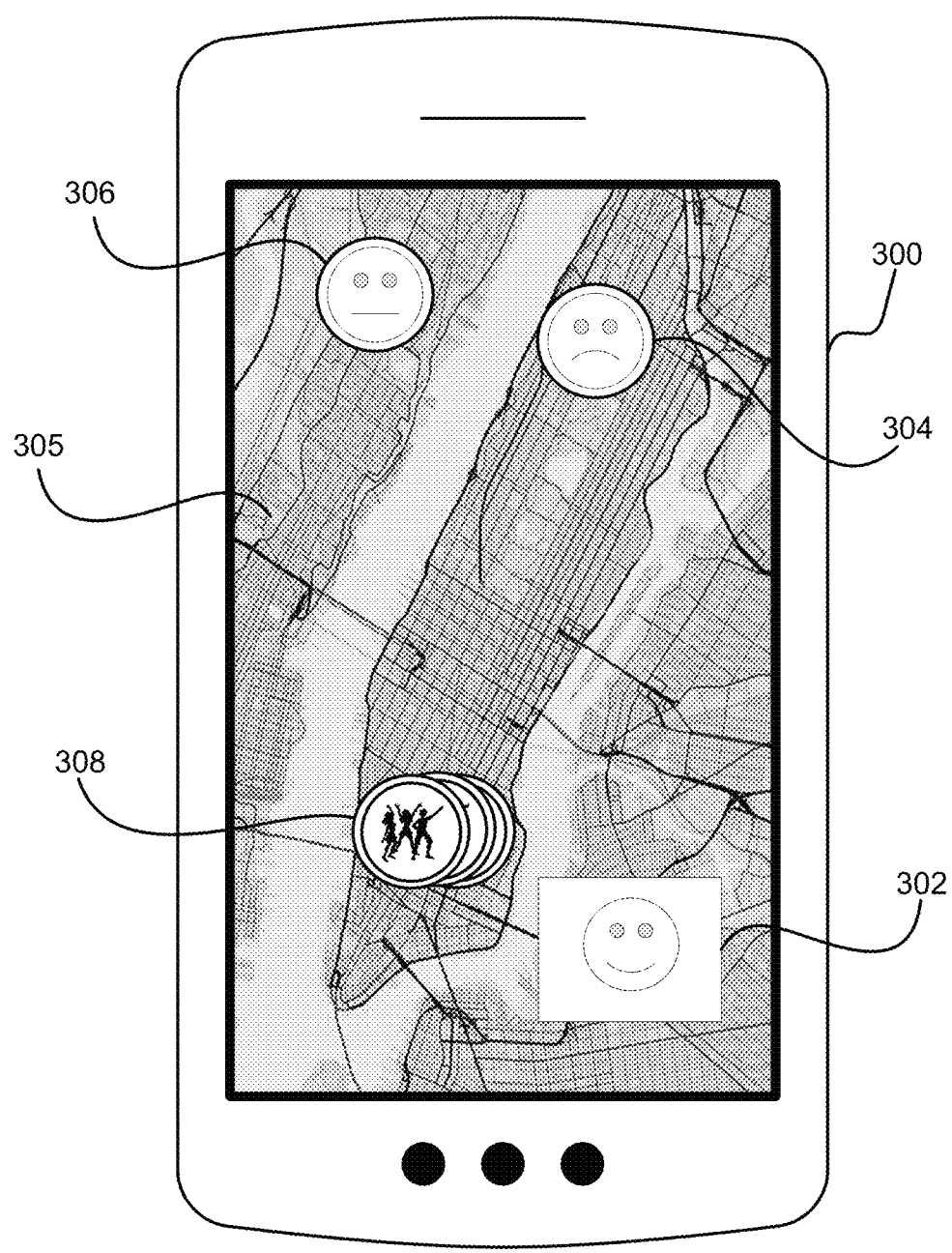
FIGS. 3A-3E illustrate exemplary client devices, in accordance with one or more embodiments of the invention.

FIG. 3A illustrates an example client device 300, according to various embodiments. Client device 300 includes a display 305 including a map, and a plurality of symbols 302, 304, 306, and 308 representing one or more posts, which may be located on the map. The items included on display 305 may be based on one or more user profiles, atlases, channels, layers, social media posts, and/or post attributes.

Symbols 302, 304, 306, and 308 may correspond to a social media post, which may be included in a layer, which may be included in a channel, which may be included in an atlas.

In one or more embodiments, symbol 302 includes a shape including an emoji. The shape included in symbol 302 may include a color which may be representative of an emotion which a user may enter on client device 300. For example, client device 300 may receive input causing it to create a post, and the input may include post data such as a location, symbol, and/or an emotion, all of which may be determined by system 100 and/or entered by a user. In one or more embodiments, a color may be associated with post 302 (e.g., the shape may be colored), and the color may be based on an emotion entered by a user on client device 300.

In one or more embodiments a symbol 304 and 306 may be shown which indicates an emotion. For example, a symbol 304 and 306 may be shown on client device 300 and include an emoji (e.g., a face, a firework, a church), which may show an indifferent face (e.g., symbol 306) or an unhappy face (e.g., symbol 304).

In one or more embodiments, client device 300 may show on its display 305 an aggregation of posts (e.g., reviews) such as symbol 308. For example, instead of showing a plurality of posts which do not overlap, symbol 308 may indicate the plurality of posts. In one or more embodiments, if a user selects symbol 308 a plurality of at least a portion of reviews may be shown which may be posted by other users of a social network. After a user selects symbol 308, multiple posts may be provided to a user, which may each include at least a portion of a review. In one or more embodiments, a user may view a complete review—which may include images, text, videos, audio, etc.—in response to selecting a review shown after the user has selected the aggregation of posts symbol 308.

In one or more embodiments, text may be shown on display 305. For example, text may be shown indicating an amount of zoom, an amount of votes a post has received, etc. In some embodiments, text may be included in a post and displayed on client device 300. For example, a user may select symbol 306 and text may be shown associated with a post represented by symbol 306. The text may indicate why symbol 306 includes an indifferent emoji. In one or more embodiments, text included in a post may be used to create symbol 306. For instance, text discussing how bad a location is may cause a symbol (e.g., symbol 304) to be associated with a post, wherein the symbol denotes an unhappy emotion (such as an emoji with an unhappy face).

In one or more embodiments, a system includes functionality to receive, from a client device, a request for one or more social media posts. For example, the system may receive a request from the client device 300. The request may include screen attribute information about the display 305 of the client device. For example, the size of the display 305, the resolution of the display 305, areas of a map displayed on the display 305, etc. The request may include geographic location information, for example, identifying a geographic location of the client device 300 or an area/specific location navigated to where the client device 300 is not currently located. The request may include identification of a requesting account of the social network, for example, the account associated with a user of the client device 300.

In one or more embodiments, the system includes functionality to identify a set of temporally recent social media posts based on the screen attribute information and the geographic location information. For example, the system may only identify social media posts that have been posted within the most recent 15 minutes, 30 minutes, 45 minutes, 1 hour, 2 hours, 3 hours, 12 hours, and 24 hours. In addition, the system may only identify social media posts that are within a proximity of distance from the location included in the geographic location information, and/or within a map view specified by the screen attribute information.

In one or more embodiments, the request further includes a category indication. For example, the category (or atlas, channel, and/or layer) may be restaurants, bars, sports venues, etc. Identifying the set of temporally recent social media posts may be based on the category indication. In other words, the identification may partially or completely exclude social media posts that are not included in the indicated category.

In one or more embodiments, the system includes functionality to apply grouping criteria to the set of social media posts to generate a suggested group. For example, the system may further filter the social media posts to determine a suggested group of social media posts that may be later provided to the client device. Accordingly, the suggested group may be a subset of the set of social media posts.

In one or more embodiments, applying the grouping criteria includes ranking each social media post of the set of social media posts according to a customized score for each social media post. The customized score may be based on a set of preference factors (corresponding to the requesting account) that are applied to a general score of each social media post. For example, each social media post may include a general score that is not specific to any particular user or preference. The general score may be based on various factors, like general popularity. One or more preference factors may define preferences of a particular account. Such preference factors may be applied to the general score of a social media post to arrive at a customized score for the social media post. In other words, the preference factors may be used to determine a weighted version of the general score, resulting in the customized score that is specific to the particular. In the absence of a preference factor, the unweighted general score may be used.

A preference factor may be implicit or explicit. For example, a preference factor may be determined based on an account's past behavior or account attributes (e.g., demographics like age, sex, gender, etc.), or may be based on explicit indications made by the account.

In one or more embodiments, the system includes functionality to rank each social media post based on a distance between a geographic location corresponding with the social media post and the geographic location information. For example, the social media post may correspond with a location such as a salsa club, and the ranking may be based on the distance of that salsa club from the location identified by the geographic location information.

In one or more embodiments, the system includes functionality to select, based the ranking, the subset of the set of social media posts for inclusion in the suggested group. The selecting may involve excluding at least one social media post of the set of social media posts from inclusion in the suggested group based on the ranking. In one or more embodiments, system includes functionality to provide, in response to the request, the suggested group for display by the client device 300.

Figure 3B:
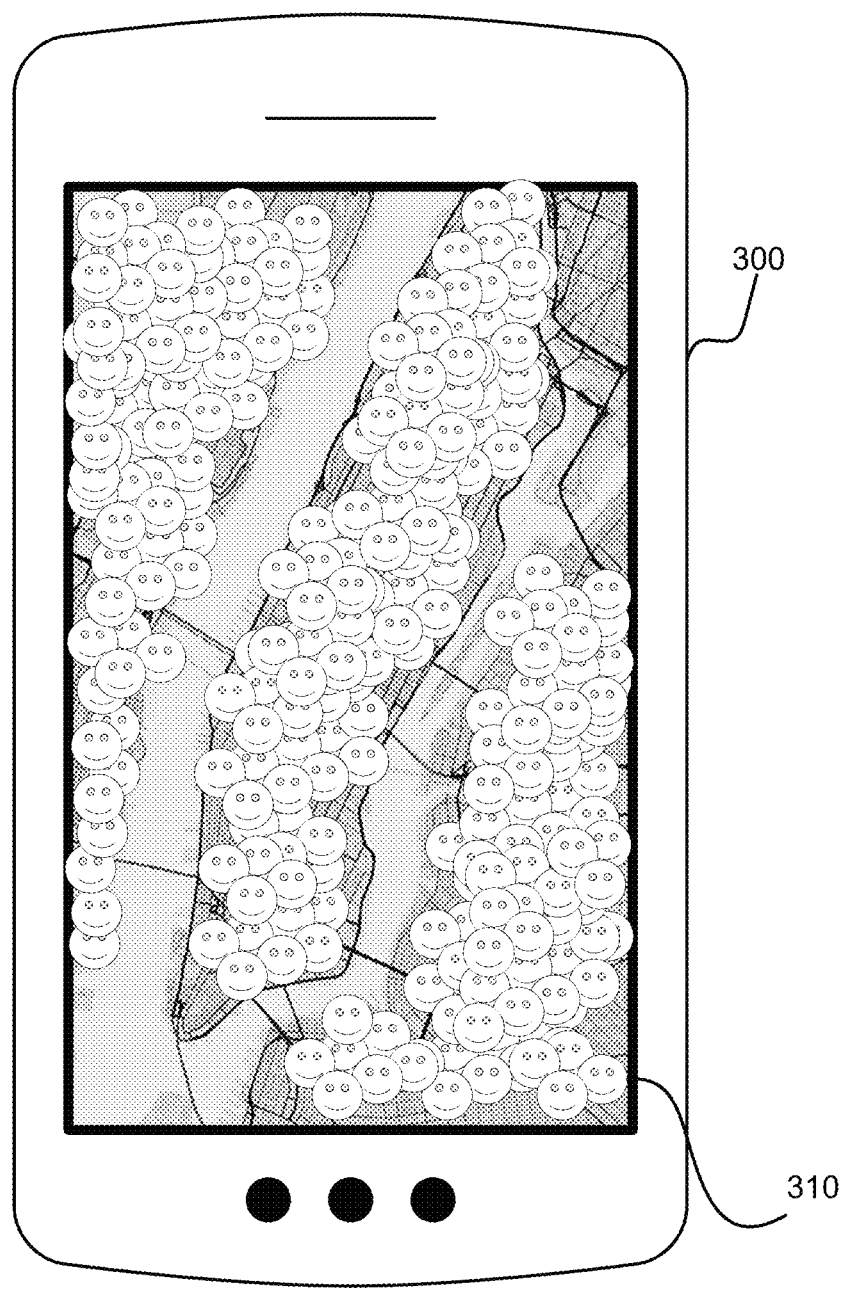

FIG. 3B illustrates an example client device 300, according to various embodiments. As can be seen on example client device 300, and as described throughout the instant disclosure, in some embodiments a plurality of social media posts 310 (e.g., reviews) may be shown on a display so much show that the display is of no use. For example, the display shown in FIG. 3B includes so many symbols representing posts that a user cannot sort through them all. As such, systems and methods described herein may cause a display to provide posts in a more digestible manner. For example, posts may be aggregated such that a single symbol may represent a plurality of posts, and thus the posts may not clutter screen real estate. An addition, or as another method, posts may be filtered at least by attributes (e.g., post attributes) such that only a subset of posts are shown (e.g., posts may be filtered by a type of restaurant, music playing at a venue, etc.).

In various embodiments, a system can be configured to transform less important content into expanded bubbles at lower zoom levels. Less important (e.g., having a lower score/value) content may be displayed/seen less frequently during the aggregation display and may pop up less frequently.

Digestible content can be created in all or most of the viewport options (e.g., view modes and/or configurations). In one or more embodiments, the utilized display is configured to "flex" or transform in display, allowing users to view a summary of the content in a specific area, while also having the ability to see the most relevant individual posts without having to zoom in. The overall effect of the system is to provide an overview of the most important human activity in a country, region, city, or other level.

In various embodiments, as the number of users of the social network grow, the use of static pins may become exponentially less effective. As more users begin using the system, the ability to discern relevant content becomes more difficult. The location-based content platform displays content based on relevancy in relation to the user's viewpoint. As the user's location and relevancy of data change, the system is configured to hide and show Bubbles/posts dynamically in order to filter out content determined to be less relevant to the user.

As described herein, due to: (1) a potential amount of posts (e.g., hundreds or thousands); and (2) the amount of screen real estate on a client device, some posts may need to be shown more predominantly than others. For example, some posts may be larger than other posts so a user can easily view them. If, for instance, all posts were the same size and all shown at the same time, then hundreds or thousands of posts would overcrowd a display making the map, and therefore the posts, virtually useless (e.g., as shown in FIG. 3B). Thus, the concept of filtering posts by a variety of atlases, channels, and/or layers allows users to quickly and easily obtain the information they need.

Figure 3C:
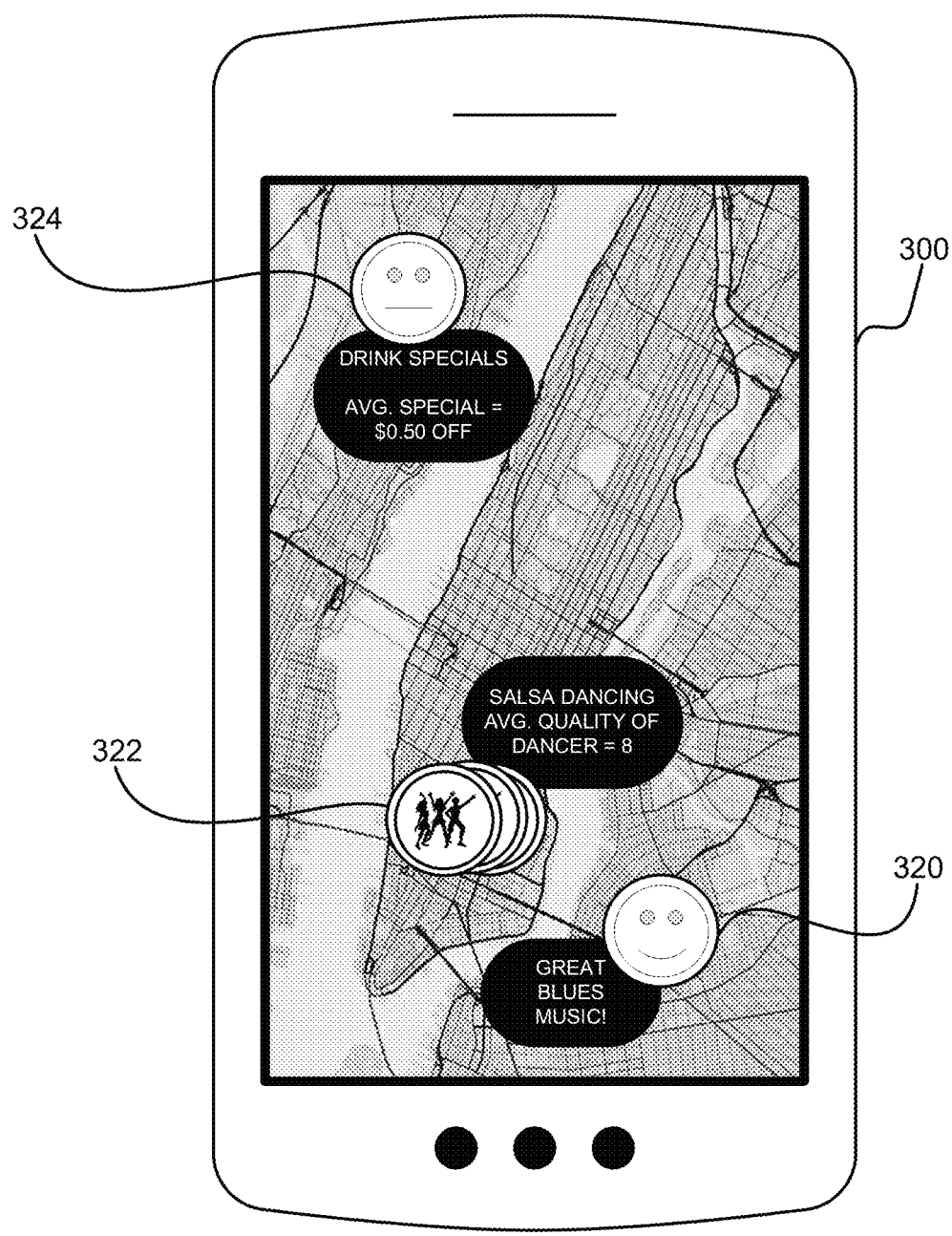

Thus, in various embodiments (e.g., as shown in FIG. 3C) rather than show many posts of the same size, which may be indistinguishable from one another, some posts may be shown as being larger, with a different color, be associated with an emotion (which may be indicated by an emoticon/emoji), be shown as a small cluster 322, or otherwise be more displayed more predominantly than other posts. The attributes of these posts may be based on an atlas, channel, and/or layer which they are included in. Further, in various embodiments, when a user has zoomed out, they may see posts that have a high importance level (also referred to herein interchangeably with a value or a score), and when they zoom in on an area, a system may show a user posts with lower importance values. As such, various posts may be filtered out when a user is viewing a map from a certain "altitude." In other words, from a distance a user may see things that are important to them—wherein importance can be based on a variety of factors—while when close up a user may be able to see posts that were not so important to them, but may be shown for one or more other reasons (e.g., other than the user's preferences).

Further, in some embodiments, a user (e.g., a user account) (or an atlas, channel, and/or layer) may be associated with tags, which may each have a value associated with them (e.g., sports—7; restaurants—4; karaoke bars—9; museums—6; video game arcades—2; movie theaters—3; fishing—8). These tags and, in some cases the values associated with the tags, may be used to determine the importance of a social media post to a user, and affect what social media posts are displayed as discussed herein.

Similarly, in some embodiments, posts may be more relevant/important based on time. Or, a channel may include posts based on time. For example, if posts were made within the previous 1-2 hours they may be displayed on a screen more predominantly than posts that were made a day or two before. In some embodiments, posts that were made on the same day of the week (e.g., Friday), time of the year (e.g., Christmas), and/or have some type of unique/important/relevant temporal aspect may be shown more predominantly than other posts.

Further, posts may be ephemeral in nature. For example, if a system knows that a happy hour will end at a certain time (e.g., because a user or restaurant owner makes a post indicating so), then a post may quickly become less predominant when (or close to when) the happy hour ends—as opposed to a post about a party which slowly dies down over the course of 2-3 hours. Similarly, a system that provides posts about clubs, restaurants, museums, zoos, or any other place that closes may cause the posts about those places to disappear quickly when the location and/or venue closes (or is close to closing (e.g., within an hour)). In some embodiments, if a user sets up their system such that they rank where their friends are very highly (in one way or another), when their friends move from one place to another a post made by a friend or someone else at a location may disappear much quicker than if it had been made by someone ranked lower (e.g., a stranger to the user (e.g., a non-first-level-connection)).

Just as various posts may be ephemeral in nature, in some embodiments posts will last longer than other posts. For example, if a user makes an atlas, channel, and/or layer that ranks salsa dancing very highly, then a post about a salsa club may be displayed more predominantly and/or for a longer period of time than a jazz club which may have more people or otherwise be more fun to a greater number of users of the social network.

FIG. 3C illustrates an example client device 300, according to various embodiments. Client device 300 includes symbols 320, 322, and 324. In one or more embodiments, symbols 320, 322, and 324 may be symbols that are an aggregate of two or more posts. In addition, some posts may be associated with text.

In one or more embodiments, text may be altered. For example, text may be altered by appearing or disappearing on display 305 based on a variety of factors. Text may be displayed on a tab, wherein the tab is associated with a symbol (e.g., a tab may be emerging from a symbol (also referred to as a graphical symbol)). Altering text may include displaying additional text, or less text. In one or more embodiments, text may be altered based on an input received by a client device such as where a tab is selected. For example, text shown in FIG. 3C may correspond with symbol 320, and may show more or less text, at least a portion of which says, "GREAT BLUES MUSIC!"

Moreover, text may include an indication of a value associated with an attribute (e.g., a post attribute). In one or more embodiments, various symbols or other representations of posts may be shown based on values (e.g., rankings) associated with particular attributes. For example, a user may filter posts/aggregated posts (which may be used interchangeably herein with creating and/or viewing an atlas, channel, and/or layer). In one or more examples, as shown in example FIG. 3C, posts may be filtered by nightlife. Various attributes, such as drink specials, salsa dancing, and blues music may be attributes that are filtered. For example, here, Broadway shows may be filtered out (and may have been shown on the cluttered map in FIG. 3B. Posts, symbols, etc. may be shown over others based on rankings/values associated with the attributes (which may be based on an atlas, channel, and/or layer to which a post/symbol belongs). For example, many dancing symbols 322 may be shown, and text corresponding to the dancing symbols may show that the average salsa dancer at one or more locations has a skill level of 8. Thus, in some embodiments, this set of posts/aggregated symbol may be shown rather than one in another part of town. Similarly, an attribute such as drink specials may be associated with an ambivalent face as shown by symbol 324 and its corresponding text. In some embodiments, a plurality of attributes corresponding with one or more locations may correspond to a plurality of rankings, all of which may be used to determine how many, a type of, and/or where a symbol/post may be shown on a map, as described herein.

In one or more embodiments, instead of rankings corresponding with attributes corresponding to a post, or in combination with rankings corresponding to post attributes, in one or more embodiments a post itself may be based on a relevance number. A relevance number may be based on various post attributes including, but not limited to: a time that a post was recorded, a number of votes received by a post, a number of positive/up votes received by a post, a number of negative/down votes received by a post, an aggregation of a number of positive/up and negative/down votes received by a post, a number of comments received by a post (e.g., associated with a post), a number of positive/up votes received by comments associated with a post, a time of at least one comment, and/or a comment relevance (e.g., whether the comment has something to do with the post, whether the comment was posted by user's connection within a social network).

Figure 3D:
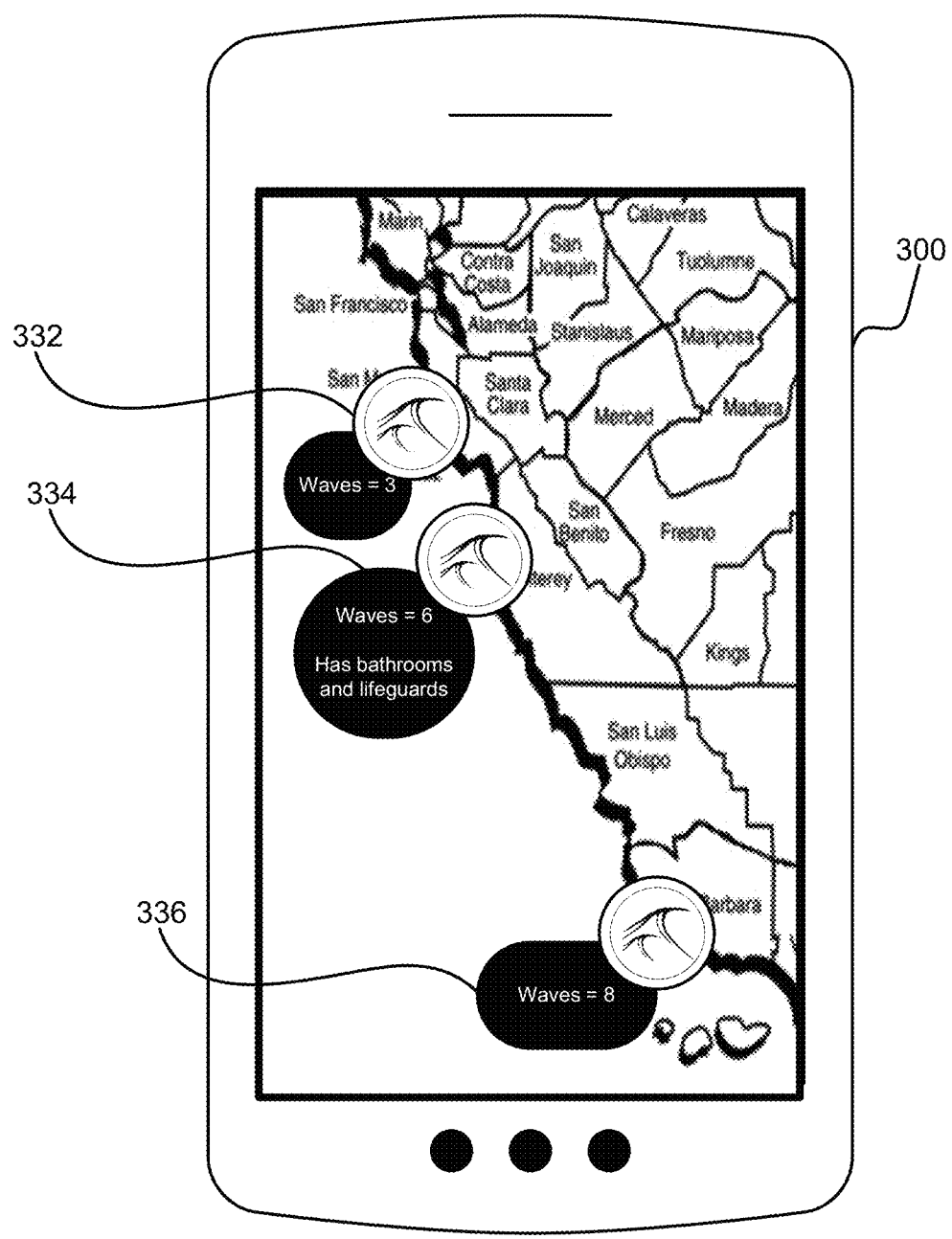

FIG. 3D illustrates an example client device 300, according to various embodiments. As with 3C, attributes of symbols 332, 334, and 336 (e.g., post attributes of posts represented by symbols 332, 334, and 336) may be shown based on rankings associated with their attributes. For example, symbol 336 may be shown based on an attribute the quality of waves associated with beach/symbol 336. In one or more embodiments, information corresponding with an attribute of a post or symbol may be received from a system from a canonical (e.g., third-party source). For example, information from a beach information website may provide a system with the quality of waves. Similarly, in some embodiments, information provided by a website such as Yelp!™ may be used to determine a value of an attribute corresponding to a location/post. As another example, an RSS feed (e.g., from a twitter account) may be used to rank attributes, create posts, and/or determine which posts/symbols will be displayed on a client device. In some embodiments, a post/symbol such as 332 may not be shown because its value associated with waves is only 3. However, it may be shown—despite its wave ranking of 3—based on rankings provided by one or more users. For example, a combination of the rankings of attributes of a post (e.g., the quality of waves, wherein waves is an attribute of a location) may be combined with rankings of a post itself (e.g., a beach in Santa Cruz where people are surfing).

In some embodiments, a cumulative ranking of a post/group of posts may be based on rankings of multiple attributes. For example, a post/symbol 334 of a beach in Monterey may indicate that the quality of waves is a 6, and that the beach has bathrooms and lifeguards such that children may go into the water there. In one or more embodiments, the cleanliness of the bathrooms may be ranked and/or the quality of the waves—which may all be included in the overall ranking of the location (e.g., whether it may be shown on a particular map created by one or more users).

As described throughout this disclosure, a beach in Santa Cruz may be a location about which a post may be made, and be associated with one or more of an atlas, channel, and/or layer. Many posts may be aggregated into a single post such that a map is not cluttered. A post and/or aggregated post (which may be represented by a symbol) may have attributes associated with it/corresponding to it (e.g., waves). In one or more or more embodiments, the attributes may have their own rankings, which may affect which or whether a post/symbol is shown on a map on a client device. An example of an attribute with its own ranking would be an attribute such as waves, which are ranked by a quality (e.g., surfability, size, etc.).

In one or more embodiments, the system can be configured to determine relevancy of a posting user based on one or more signals including, but not limited to: whether a user is following another user (e.g., whether connected, or simply being updated when a person posts (e.g., unilateral following)); whether a user is subscribed to a map channel which is also subscribed to by a posting user; and/or whether the viewing user share interest with the posting user; whether the viewing user shares demographic traits with the posting user.

In one or more embodiments, according to the derived importance and/or relevancy scores, the system can be configured to do one or more of the following including, but not limited to: showing the content more prominently on the map; expand or display the content at higher zoom levels; expand or display the content with more frequency either individually or in aggregate; and/or expand or Display more content of that type. Importance and/or relevancy scores may also be based at least in part on an atlas, channel, and/or layer in which a social media post is included.

Relevancy scores/cues may be a weighted aggregate comprising, without limitation: Comment Score, Vote Score, and/or Time Score. A Comment Score may be a number determined by the number of comments that a post has and how recent each comment was posted. Older comments may have a lower score, more recent comments may have a higher score. A Vote Score may be a number determined by the number of total votes and up votes that the post has received, weighted by how recent those votes took place. In some embodiments, a Time Score may be a number weighted by how old the post is, older posts have a lower score. By using the aggregated Relevancy score/values, it may be possible to surface the most relevant and popular content.

Further, in some embodiments some activities or locations that a user is interested in may be weighted differently than others. For example, if a user likes Mexican food they may weight Mexican food 3 times higher than Korean BBQ. As such, if a particular Mexican food restaurant has a rating/score of 3, and a Korean BBQ restaurant has a rating/score of 7, then the Mexican food restaurant would have a total weighting of 9 (e.g., 3×3) making it more relevant/important to the user who likes Mexican food.

In some embodiments, an ephemerality system (e.g., a system that may add or remove posts based at least in part on a period of time) may provide user control over post content ephemerality on a map-based social network. This has multiple advantages such as providing a more accurate representation of "what's going on now", and giving a real time feel to the map. Further, disappearing posts may add space so map content doesn't fill the screen, thereby allowing the system to scale in user numbers and post without overflowing their screen.

In one embodiment, users are given the ability to select how long posts—or certain types of posts (e.g., based on a channel)—remain on a map. A duration of a post can range from less than seconds, seconds, minutes, hours, days, weeks, months, years, or all the way to infinite duration.

In one embodiment, a history scrubber allows users to rewind back into time and see the map as it existed some place in the past (which may be stored in a copy of an atlas, channel, and/or layer copied at an earlier point in time). This gives the benefits of "real time" posting (what's happening now) while providing the ability to see historical information (what was happening then). This way, a real-time overview of human events is provided while not overflowing the map with old social postings. This can be configured to work analogously to moving forward and back on a YouTube video, entering date information, using incremental time controls, having versions of maps, and so on.

In some embodiments, a user may see what happened on a previous weekend, such as where their friends went and/or what types of posts happened at different places. Such functionality may be combined with a third-party source such that a user can have multiple sources of information to make a more informed decision regarding what play they would like to see, where they would like to go, what they would like to eat, who they would like to spend their time with, etc.

It is contemplated that in some embodiments a user may tag other users, such that the user knows to stay away from a certain location, or go to a certain location. In some embodiments a user may also erase posts they made or not allow other users to see where they were or what they did at a previous point in time.

Figure 3E:
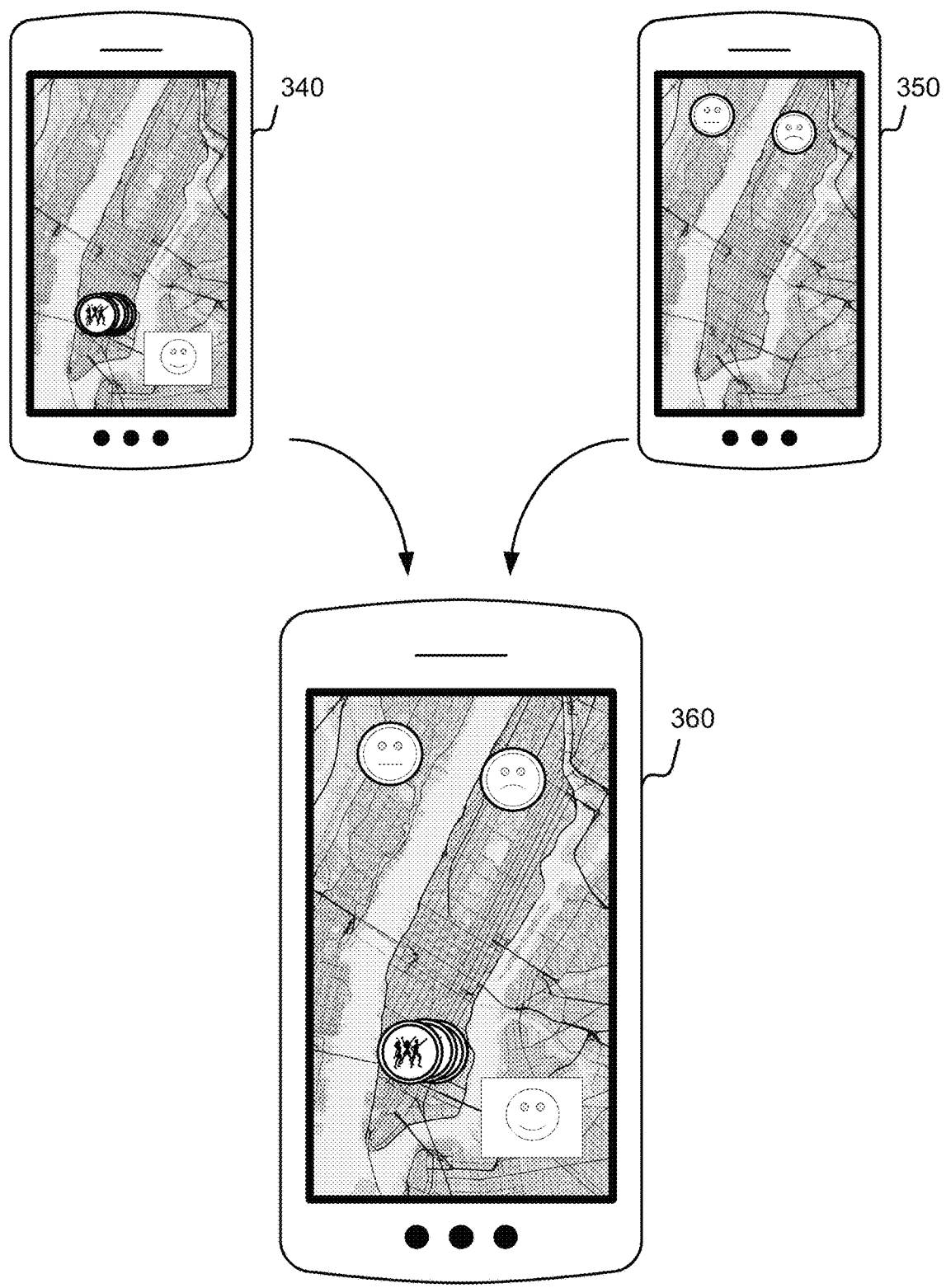

FIG. 3E shows an example of multiple maps combined into one. For example, a map shown on device 340 may be a first user's map which may be filtered by locations above a particular point. A map shown on device 350 may be filtered to show locations below a particular point. In one or more embodiments described herein, a user (e.g., a user of client device 360) may select multiple filtered maps (e.g., the maps shown on devices 340 and 350, which may have been created by strangers and/or connections) and combine those maps to be shown on their own screen. In one or more embodiments, a discussion about user profiles, atlases, channels, and/or layers included herein may be applied to such an embodiment (e.g., information from more than one user profile, atlas, channel, layer, social media post, and/or post attribute may be combined (e.g., as a map and/or posts/symbols on a map), since in some embodiments atlases, channels, layers and/or filters may be used interchangeably to described substantially the same functionality.

In some embodiments, a map may include every post and/or symbol representing every post made (e.g., to a social network). Users may configure their maps however they like. As discussed herein, a user may select a shape and size of a map shown on their mobile device, as well as the types posts shown by using filters, atlases, channels, and/or layers. In some embodiments, such as those shown in FIG. 3E, a user may cause symbols/posts from another user's system to be shown on their device (e.g., map). Many maps from many users may be shown on a user's device in a similar fashion (e.g., the information shown on devices 340 and 350 may be shown on device 360). In some embodiments, a user may import all types of information onto their system. For example, a user may import one, two, three, or ten filtered maps (e.g., maps including posts wherein the posts are shown based on a location, attribute, ranking, etc.) onto their own device (and these filtered maps may be shown on their device). In some embodiments, a user may filter the imported filtered posts/maps/symbols such that their screen is not cluttered and/or they see the types of posts/symbols that they would like to see. As with any post/symbol/attribute, they may be ranked and/or text may be included and/or altered (e.g., to show more or less text as in FIG. 3C) based on preferences of a user. In one or more embodiments, a combination of maps may be referred to as an atlas.

Figure 4:
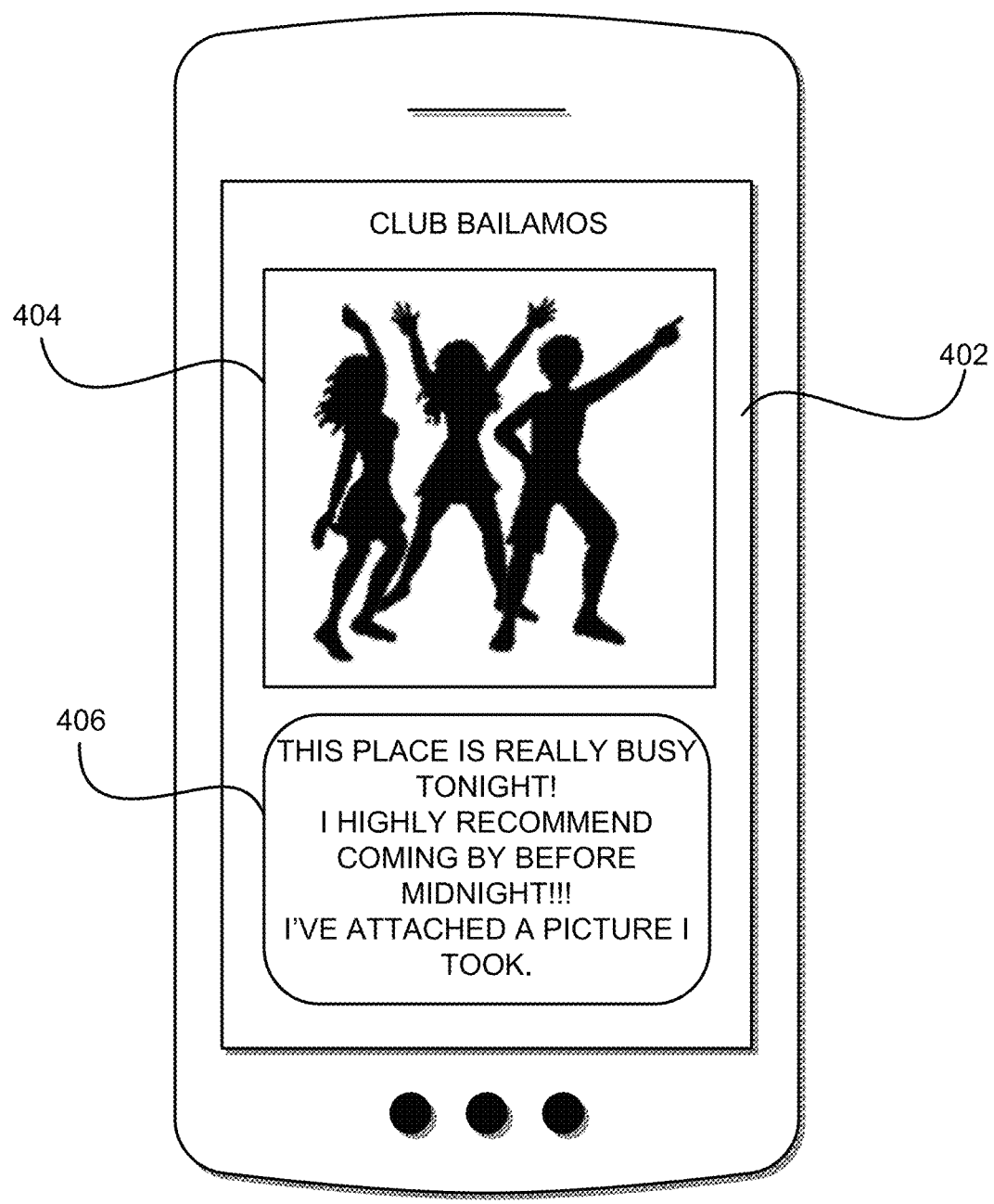
FIG. 4 illustrates an exemplary post, in accordance with one or more embodiments of the invention.

FIG. 4 illustrates an exemplary depiction of systems described herein, in accordance with one or more embodiments of the invention. FIG. 4 shows at least a portion of post and/or one or more post attributes (e.g., a review 402). Review 402 includes an image 404 and text 408. The review 402 may appear in response to device input such as the pressing of an emoji, in response to a request for a review, in response to typing in the name of a location, etc. In some embodiments users may view many reviews by swiping a screen in a particular direction, searching for a connection's reviews, searching for reviews within the previous 20 minutes, etc.

Figure 5:
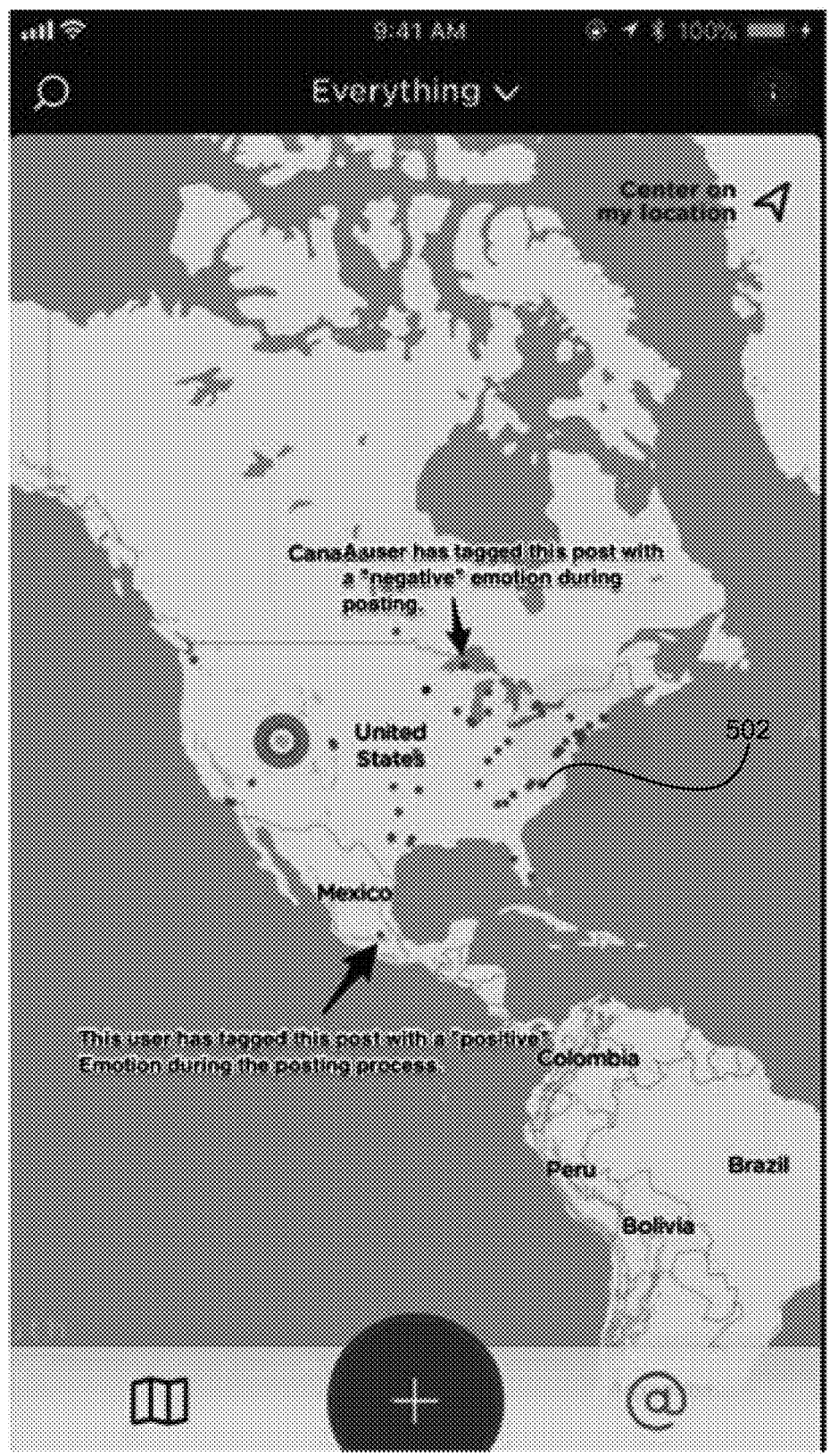
FIG. 5-6 illustrate exemplary client device displays, in accordance with one or more embodiments of the invention.

FIG. 5 shows posts 502 displayed in their minimal form, even in this form the "emotional" tags are still shown giving a user a high-level overview of the nature of posted information. However, as a user zooms in closer to a post they may various posts may become more descriptive, rather than being a simple dot on a map. If a user still does not know what they would like to do and/or see, they may post questions for other users to answer.

Figure 6:

For example, FIG. 6 shows that a user has posted a question 602 and nearby users are notified of questions posted to the map. In this example, the color is shown as grey denoting a "question" post.

Figure 7A:
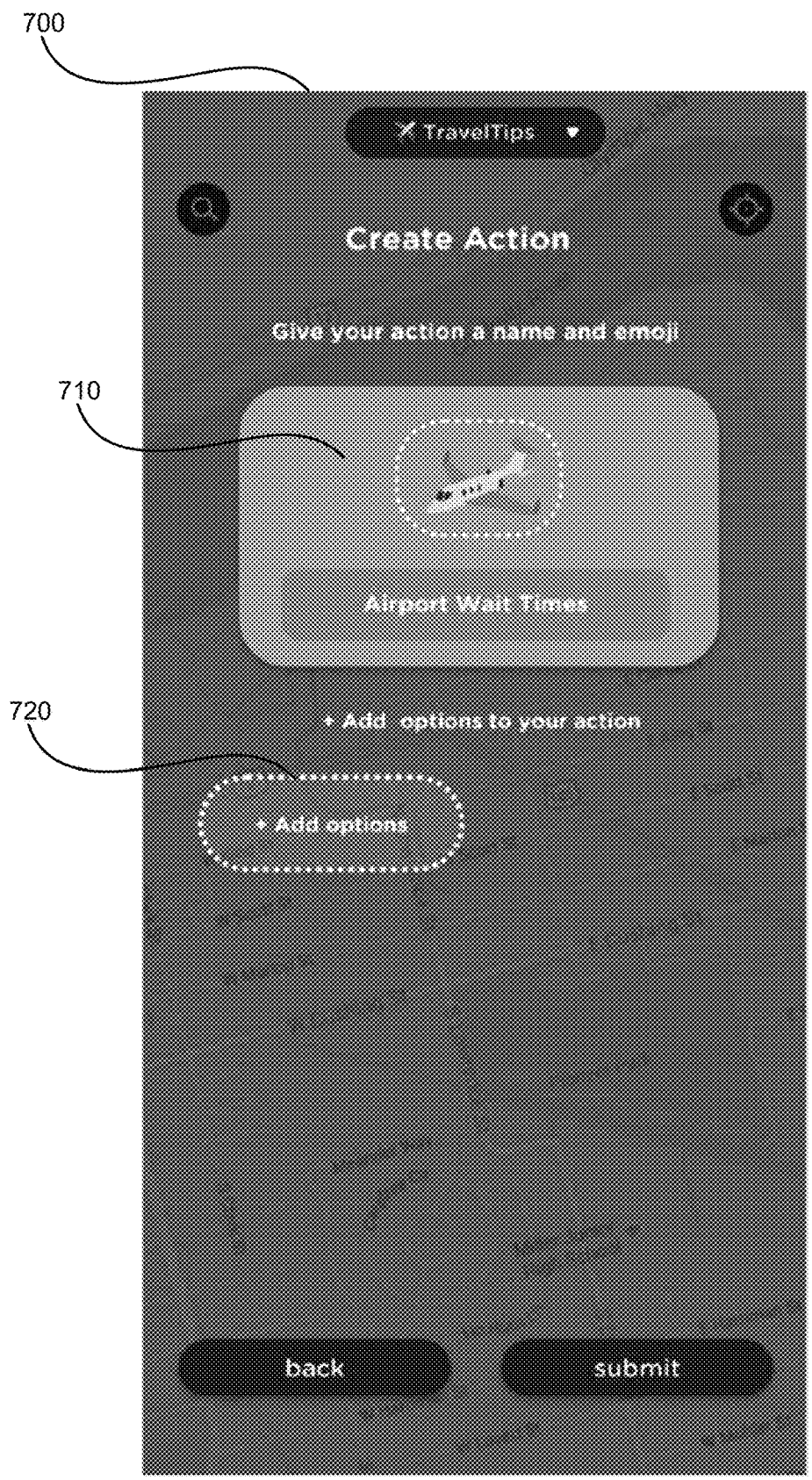
FIGS. 7A-7E illustrates an example form, in accordance with one or more embodiments of the invention.

FIG. 7A illustrates a display 700 including an example form, in accordance with some embodiments. In various embodiments, a user account (which may have different permissions than other user accounts (e.g., an administrator)) may create a form.

FIG. 7A includes an action 710, and a widget 720 configured to cause a system to add an option corresponding to the action 710. In FIG. 7A an action is created. An action may include one or more names and/or emojis. For example, action 710 is named Airport Wait Times and includes an airplane emoji.

A form may be an item that may be shown on a user's device in response to accessing a particular atlas, channel, layer, and/or social media post. In addition, a form may be provided to a user in response to a user opening the application.

By entering information into a form, one or more atlases, channels, layers, social media posts, and/or post attributes may be created, modified, edited, and/or at least partially deleted. Information entered into a form may be stored in a database. Further, information entered into a form by a user (account) may be displayed on a client device of the user, or on the client device of another user. For example, a user of a second user account may access the information entered into a form by a user corresponding to a first user account. The entered data may be included in an atlas, channel, layer, and/or social media post, and displayed on the second user's client device.

A user may enter dates, numerical ranges, text, and other information into a form. In some embodiments, a user may create a form and choose information that a form is configured to receive. In some embodiments, a form may be associated with a channel, and an administrator (e.g., a user with a higher level of access than other users) may be able to create a form while other users cannot.

In response to attempting to access a particular atlas, channel, layer, and/or social media post, a form may be provided to a user/client device (e.g., a widget on a display (e.g., a button) may be configured to display a form and/or a list of forms when selected). In one example, a form may allow a user to enter information associated with a date and surfing conditions, and one or more atlases, channels, layers, and/or social media posts may be shown. For example, one or more social media posts and/or post attributes corresponding to typical surfing conditions on a date of a year may appear in response to a user entering a date and surfing conditions on a form. Further, in response to entering information into a form, at least some information from one or more user profiles, atlases, channels, layers, social media posts, and/or post attributes may be displayed.

As one example, a form may request information from a user associated with airport conditions. In response to a request for airport conditions, a user may be requested to provide information associated with turbulence, airplane delays, security incidents, and/or destination alerts. In one example, if a user accesses one or more atlases, channels, layers, social media posts, and/or post attributes (e.g., accessing a layer associated with travel deals (which may be included in a "travel" channel)), a form may request information associated with the type of deal, a hotel, a car rental business, sight-seeing locations, etc. Of course, more than one form may be provided to a user instead of one form, in various embodiments.

It should be noted that a user may create such a form and configure it to be displayed in response to a variety of actions such as selecting/accessing an atlas, channel, layer, social media post, and/or post attribute. A user may configure a form to request information associated with an airport, travel deals, restaurants, museums, sporting events, comedy clubs, lectures, activities, races, romance/dating, etc.

In one embodiment, information entered into a form may cause at least one atlas, channel, layer, social media post, and/or post attribute to be created. For example, by entering answers to questions on a form, a map including social media posts (which may have been selected in response to the questions) may be displayed on a client device. The social media posts on the map may at least in part be based on an atlas, channel, and/or layer.

In one example, a form may be used to create a map that includes restaurant menus. The form may request titles, photos, descriptions, and/or prices of food. In one embodiment, a user may receive payment for entering information (e.g., as requested by a form). In other words, a payment account corresponding to a user account may receive payment (e.g., USD, bitcoin) by completing a form.

In some embodiments, users may create a form from a blank form or may create a form from a template. For example, a template may be configured to receive a city name, and questions about that city. In response, the form may request answers to the questions about that city.

Figure 7B:
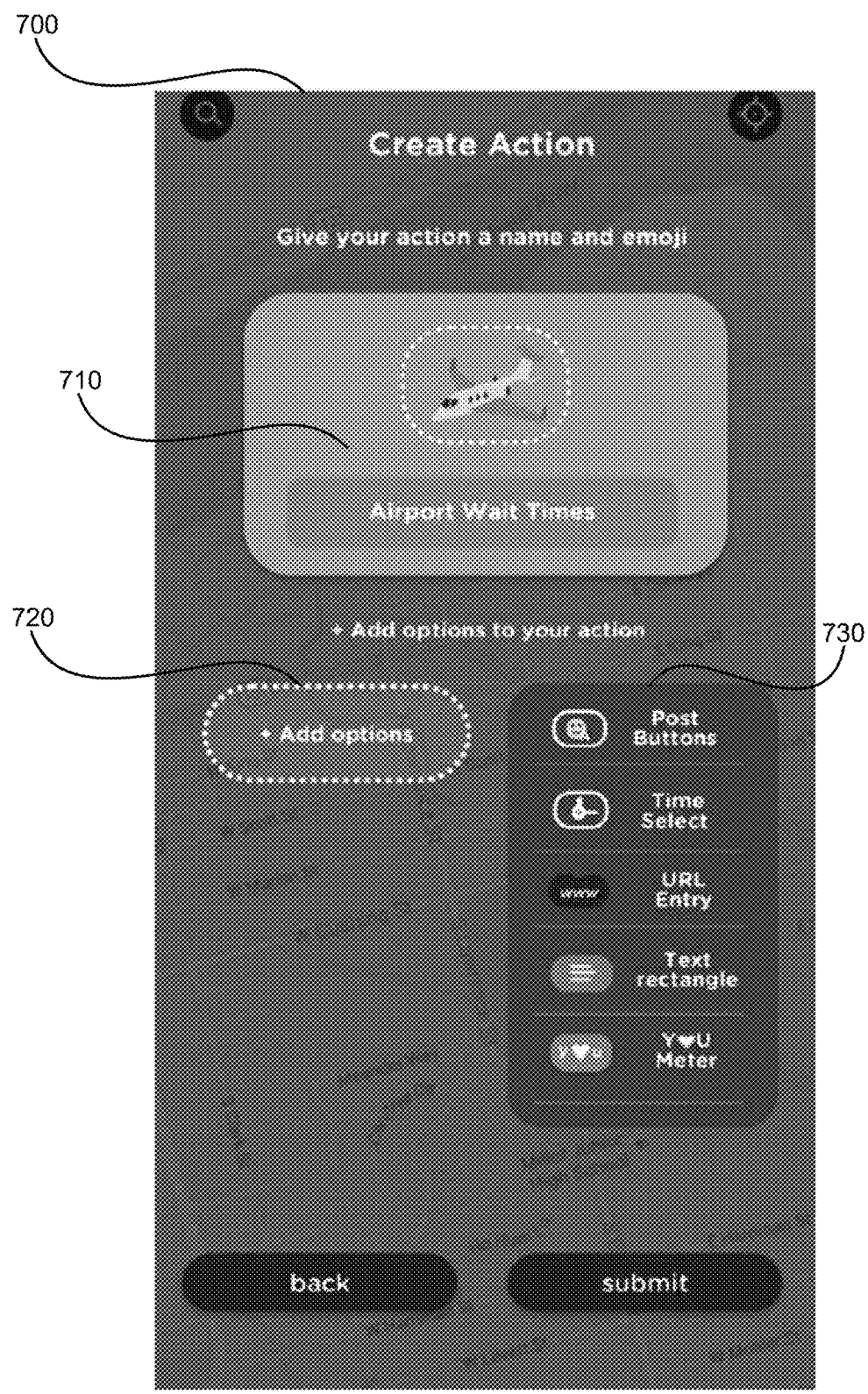

FIG. 7B illustrates a display 700 including an example form, in accordance with some embodiments. FIG. 7B includes an action 710, a widget 720 configured to cause a system to add an option corresponding to the action 710, and a list of options 730 which may correspond to an option (e.g., options may be widgets such as buttons, a widget configured to receive a time, a widget configured to receive a URL, and/or a widget configured to receive text). The form shown on display 700 may correspond with a user profile, atlas, channel, layer, social media post, and/or post attribute.

In FIG. 7B, an action is created. An action may include one or more names and/or emojis. For example, action 710 is named Airport Wait Times and includes an airplane emoji.

Figure 7C:
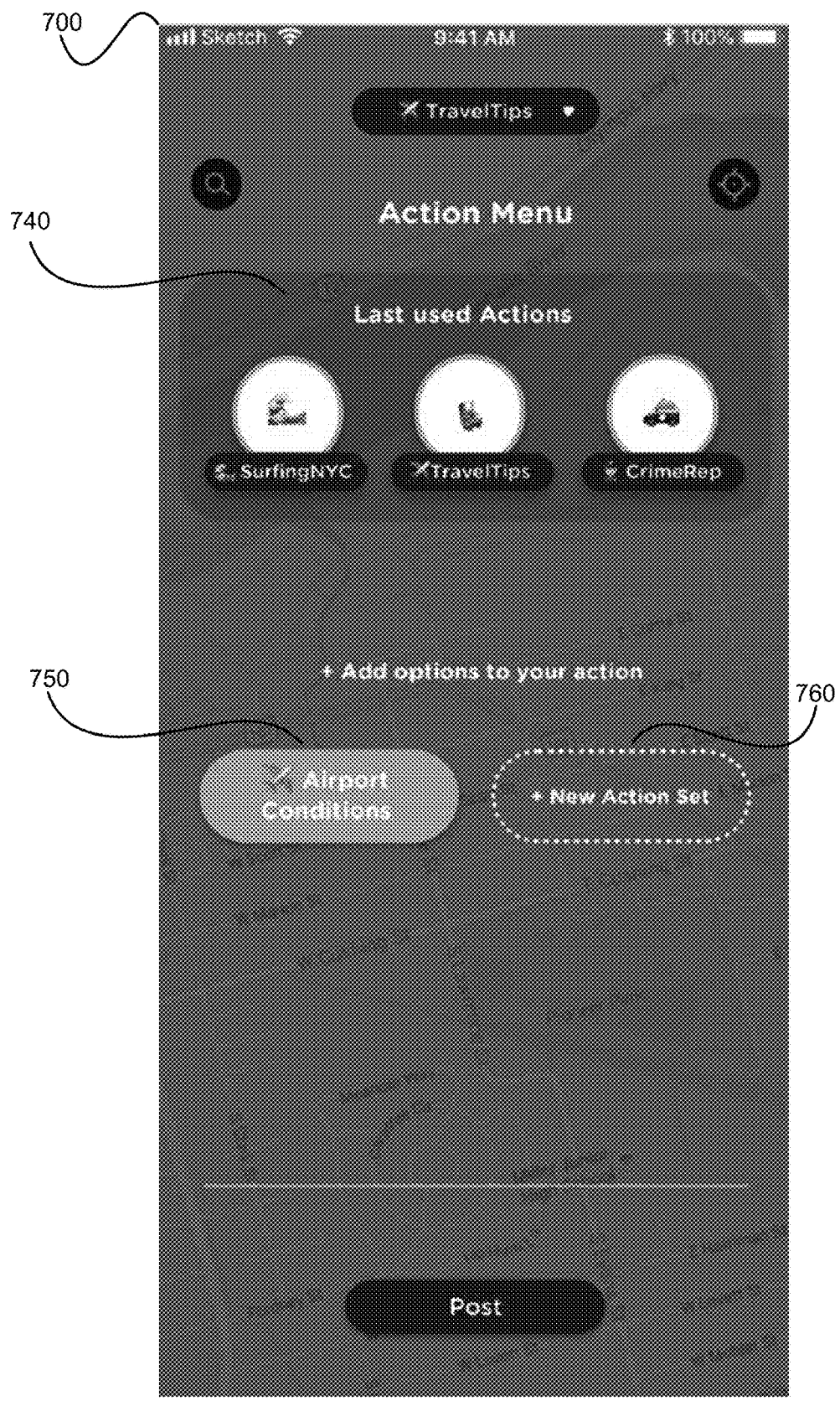

FIG. 7C illustrates a display 700 including an example form, in accordance with some embodiments. FIG. 7C includes an action menu (which may include recently used actions 740), which may be associated with a form, a user profile, an atlas, a channel, a layer, a social media post, and/or a post attribute. Further, the form shown in on display 700 may create at least part of another form, a user profile, an atlas, a channel, a layer, a social media post, and/or a post attribute. The form shown on display 700 also includes an option associated with airport attributes 750 (e.g., if creating a form, one of the options within the created form may be a widget configured to receive information associated with airport conditions). The form shown on display 700 also includes a widget configured to receive a new action set 760. A new action set may include additional forms, or actions which may occur to a map and/or location (e.g., cause a post to be made).

Figure 7D:
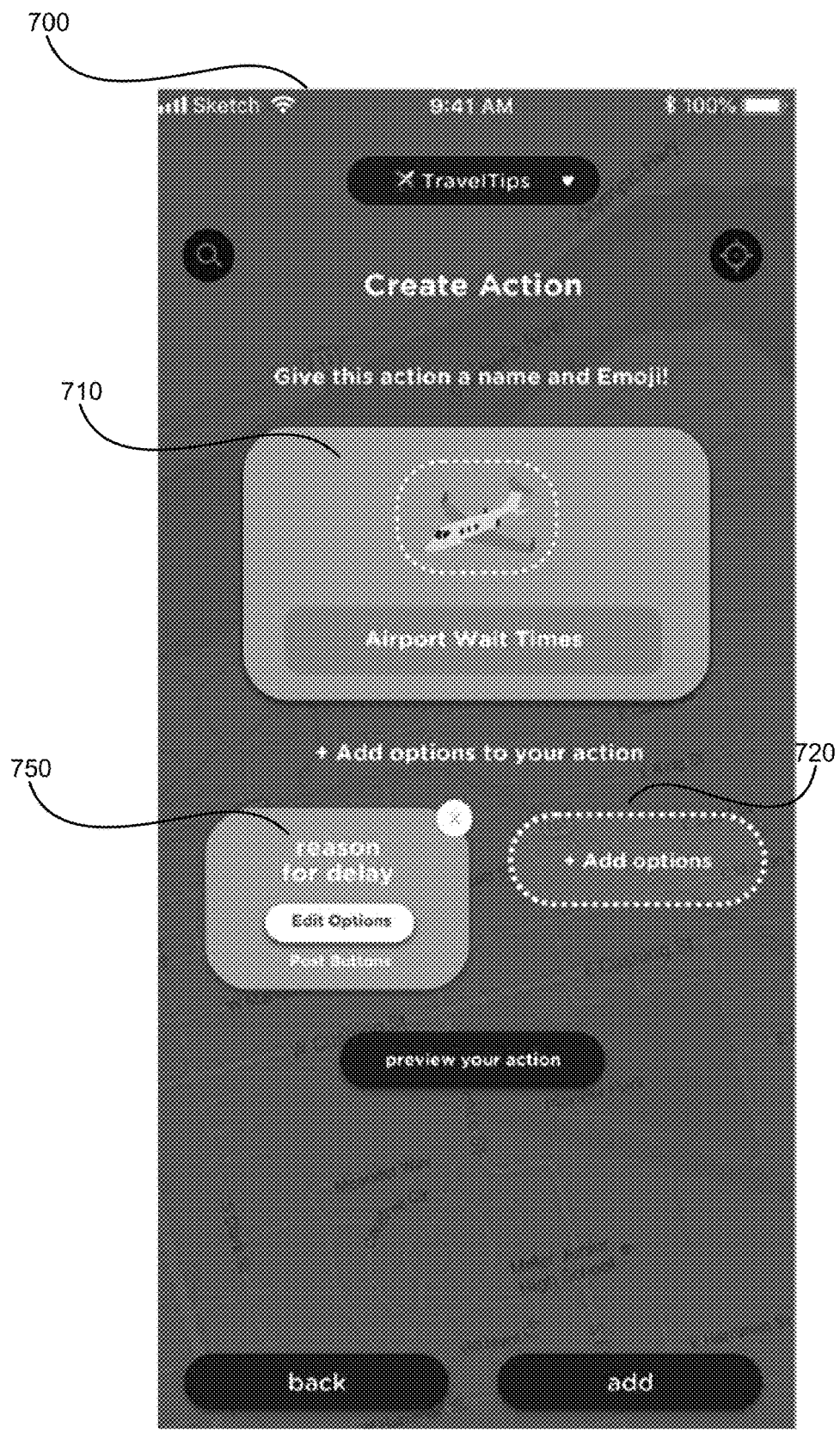

FIG. 7D illustrates a display 700 including an example form, in accordance with some embodiments. The form in display 700 may be configured to allow a user to create an action (e.g., Airport Wait Times), which may be associated with a name, an emoji (e.g., an airplane), an image, a video, etc. The form may also show an option 750 which includes a selected option (e.g., reason for delay), and widgets configured to allow a user to edit one or more options. Further, the form also shows a widget 720 configured to add an option.

Figure 7E:
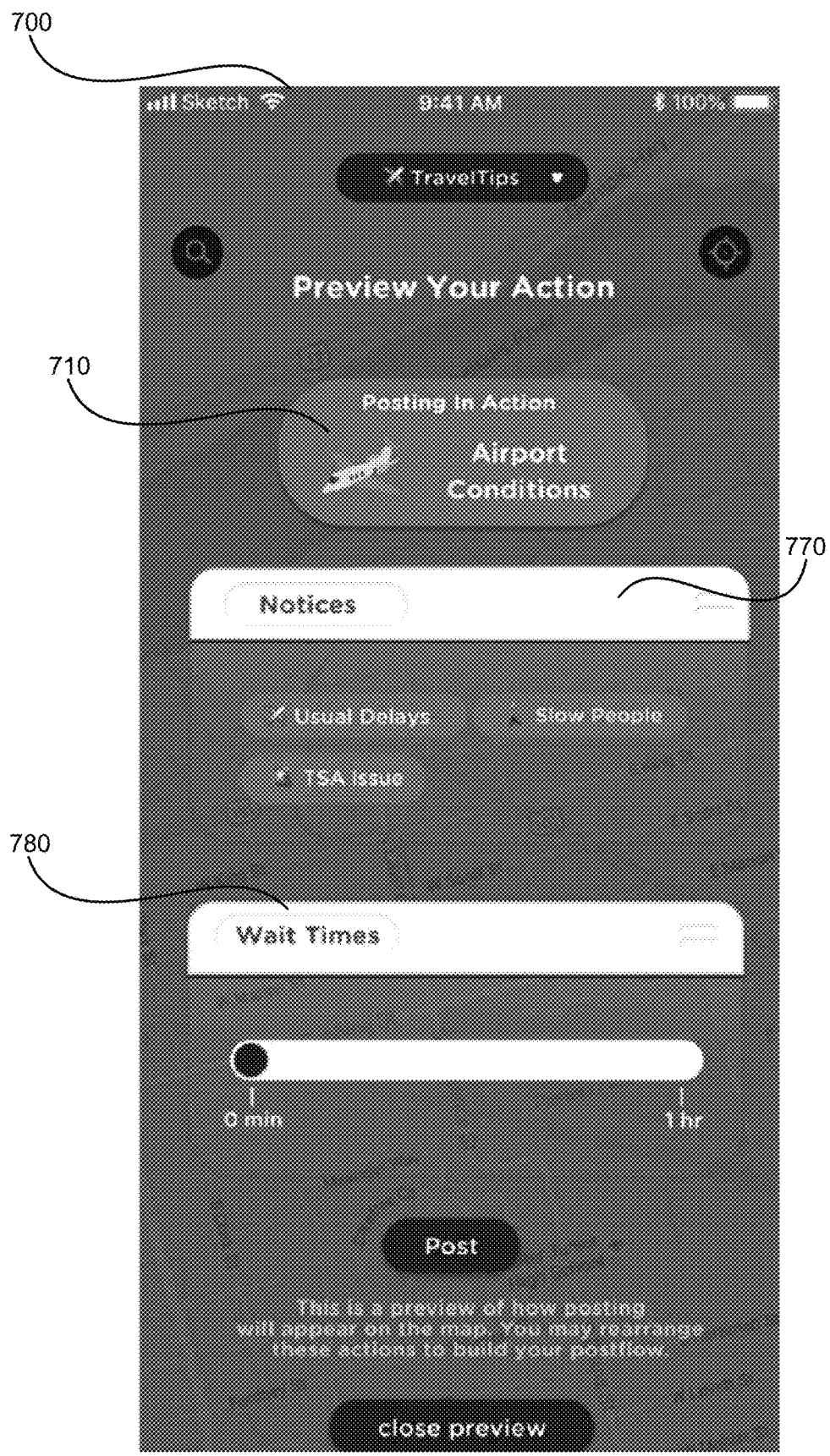

FIG. 7E illustrates a display 700 including an example form, in accordance with some embodiments. The form shown in display 700 may be associated with a user profile, an atlas, a channel, a layer, a social media post, and/or a post attribute (e.g., the form may be accessed by accessing a user profile, an atlas, a channel, a layer, a social media post, and/or a post attribute and/or the form may create a form included in a user profile, an atlas, a channel, a layer, a social media post, and/or a post attribute). The form may show a preview of an action. In FIG. 700, the action being previewed 710 is associated with Airport Conditions. The action may include notices 770 and/or wait times 780. In response to creating the action, in some embodiments, a form may be configured to receive input comprising a user selecting a notice out of the group of: usual delays, slow people, and/or TSA issues. In response to creating the action, in some embodiments, a form may be configured to receive input associated with a wait time (or any other topic), which may be received via a sliding bar widget.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

In some embodiments, systems and/or methods described with reference to FIGS. 7A-7E can be executed by, used on, used by, included in, shown/displayed on, stored in, searched by, transmitted by, assessed by, and/or received by the systems and/or devices included in FIGS. 9A-B, 10, and 11.

Figure 8:
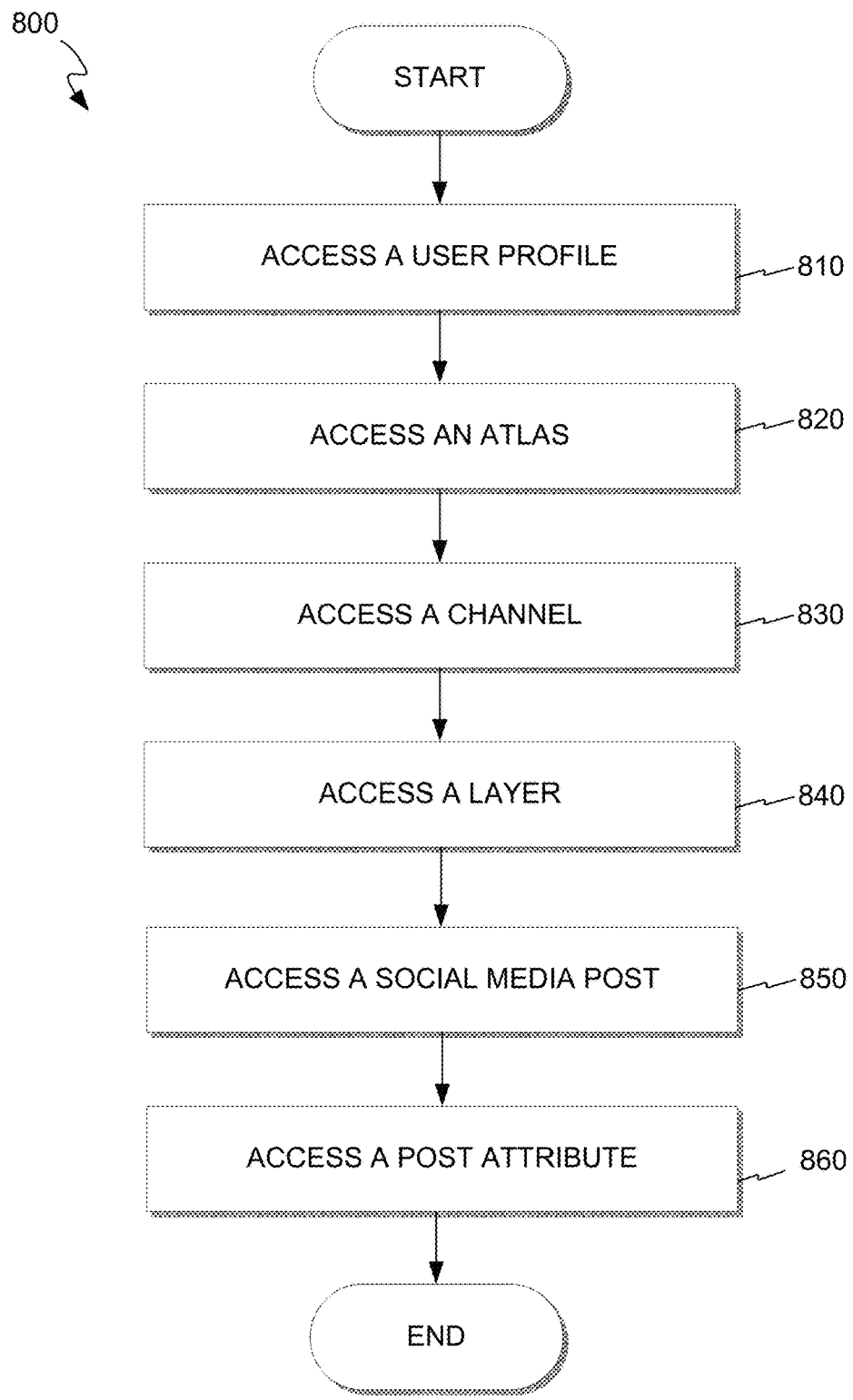
FIG. 8 illustrates a flowchart of an exemplary process, in accordance with one or more embodiments of the invention.

FIG. 8 illustrates a flow chart 800 wherein a social media post is accessed based on a combination of at least one atlas, channel, layer, and/or media post.

At step 810 a user profile is accessed. User profiles may be data structures and/or included in systems and methods described herein. User profiles may identify a user, and may include information including, but not limited to: an address, a representative image, a wall for posts, a mailbox, a form, and information that at least part of a post and/or symbol is based on, etc. A user profile may include one or more atlases, which may include one or more channels, which may include one or more layers, which may include one or more social media posts, which may include one or more post attributes. In some embodiments, social media posts shown on a screen of a client device may only include, or may not include, information accessed by and/or included in a user profile.

At step 820 an atlas is accessed. Atlases may be data structures and/or be included in user profiles. Atlases may be associated with a topic (e.g., food, temperature, airline, time, location, points of interest), and may include information including, but not limited to: a form, and information that at least part of a post and/or symbol is based on, etc. An atlas may include one or more channels, which may include one or more layers, which may include one or more social media posts, which may include one or more post attributes. Atlases may access (dynamically or statically) and/or include another atlas, a channel, a layer, a social media post, and a post attribute. In some embodiments, social media posts shown on a screen of a client device may only include, or may not include, information accessed by and/or included in an atlas.

At step 830 a channel is accessed. Channels may be data structures and/or be included in atlases. Channels may be associated with a topic (e.g., food, temperature, airline, time, location, points of interest), and may include information including, but not limited to: a form, and information that at least part of a post and/or symbol is based on, etc. A channel may include one or more layers, which may include one or more social media posts, which may include one or more post attributes. Channels may access (dynamically or statically) and/or include an atlas, another channel, a layer, a social media post, and a post attribute. In some embodiments, social media posts shown on a screen of a client device may only include, or may not include, information accessed by and/or included in a channel.

At step 840 a layer is accessed. Layers may be data structures and/or be included in channels. Layers may be associated with a topic (e.g., food, temperature, airline, time, location, points of interest), and may include information including, but not limited to: a form, and information that at least part of a post and/or symbol is based on, etc. A layer may include one or more social media posts, which may include one or more post attributes. Layers may access (dynamically or statically) and/or include an atlas, a channel, another layer, a social media post, and a post attribute. In some embodiments, social media posts shown on a screen of a client device may only include, or may not include, information accessed by and/or included in a layer.

At step 850 a social media post is accessed. Social media posts may be data structures and/or be included in layers. Social media posts may be associated with a topic (e.g., food, temperature, airline, time, location, points of interest), and may include information including, but not limited to: text, images, a location, a venue, a payment method, a cost, a time, an emotion, an emoji, an emoticon, a form, and information that at least part of a post and/or symbol is based on, etc. A social media post may include one or more post attributes, at least a portion of which may be displayed on a screen (e.g., in response to a search). Social media posts may access (dynamically or statically) and/or include information from an atlas, a channel, a layer, another social media post, and/or a post attribute.

At step 860 a post attribute is accessed. Post attributes may be data structures and/or be included in social media posts. Post attributes may be shown on a screen along with a social media post that is accessing it/it belongs to, or without at least a portion of a social media post that is accessing it/it belongs to. Post attributes may be associated with a topic (e.g., food, temperature, airline, time, location, points of interest), and may include information including, but not limited to: text, images, a location, a venue, a payment method, a cost, a time, an emotion, an emoji, an emoticon, a form, and information that at least part of a post and/or symbol is based on, etc. Post attributes may access (dynamically or statically) and/or include information from an atlas, a channel, a layer, another social media post, and/or another post attribute.

FIG. 8 illustrates a flowchart of a various method for functionality associated with the example systems described herein. While the various steps in the flowchart is presented and described sequentially, one of ordinary skill will appreciate that some or all of the steps may be executed in different orders and some or all of the steps may be executed in parallel. Further, in one or more embodiments of the invention, one or more of the steps described herein may be omitted, repeated, and/or performed in a different order. Accordingly, the specific arrangement of steps shown should not be construed as limiting the scope of the invention.

Figure 9A:
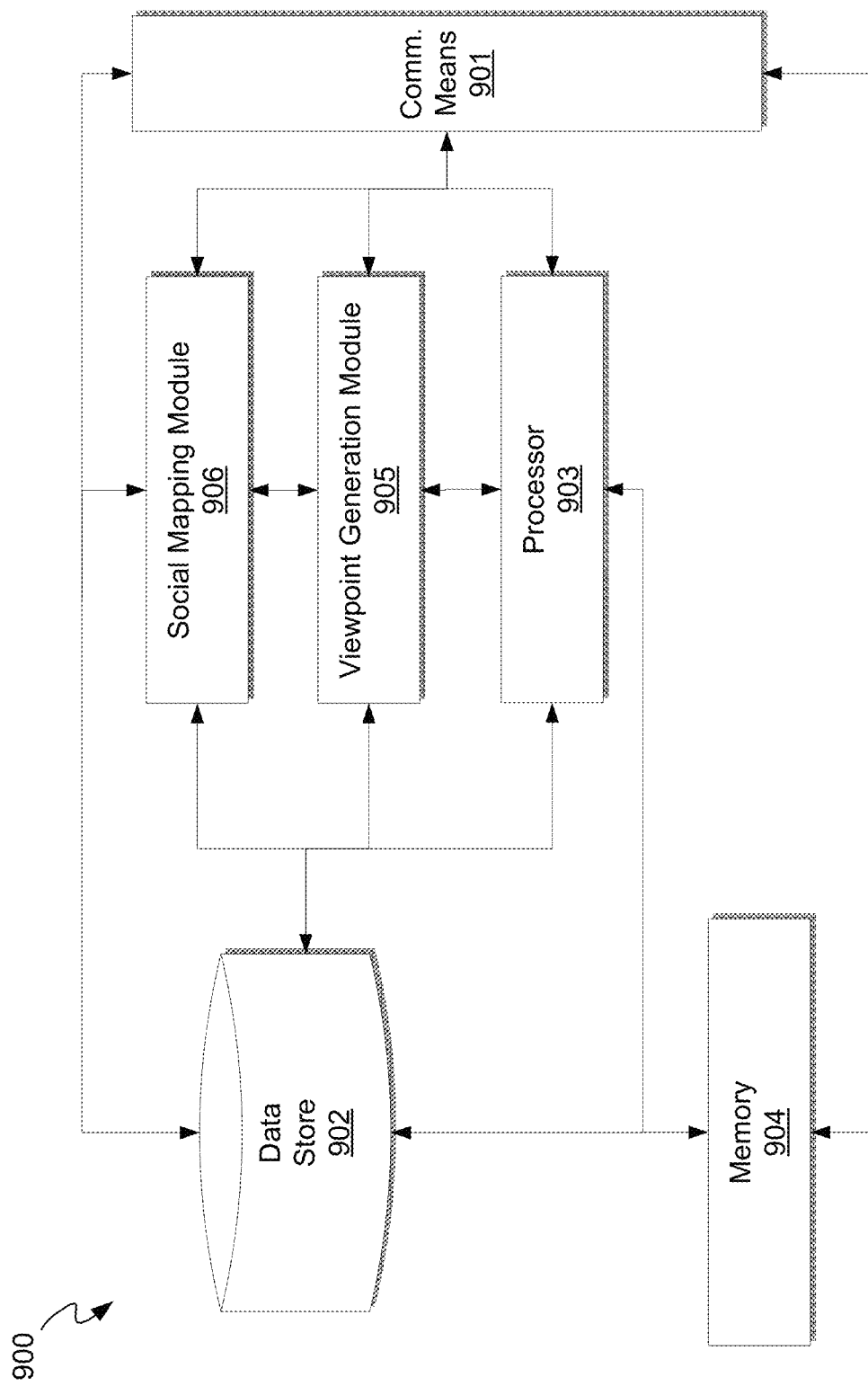
FIGS. 9A-9B illustrate exemplary schematic diagrams of a system, in accordance with one or more embodiments of the invention.

FIG. 9A shows a system 900 for receiving location information on a social network. The system 900 includes a communication means 901, a data store 902, a processor 903, memory 904, a viewpoint generation module 905, and a social mapping module 906. Various components of system 900 can be located on a client device (e.g., a mobile device, personal computer, laptop, personal digital assistant, smartphone, kiosk, cable box, television) and/or a remote computer (e.g., a server, the cloud). In one or more embodiments there can be more than one of each separate component running on a device, as well as any combination of these components within a given embodiment of the invention. Further, in one or more embodiment a client device may receive information from a social network, such as a social media post (also referred to interchangeably as a post), and/or a remote computer may receive information from a social network, such as a post.

In one or more embodiments, a social mapping module 906 may be included in system 900. A social mapping module 906 may execute on a computer processor and be configured to enable a computer processor to perform a variety of tasks. In one or more embodiments, a social mapping module may receive social mapping data (e.g., a post, which may be received from data store 902), where the social mapping data is associated with one or more geographic locations. For example, social mapping data may be used to identify and/or locate places where the social mapping data (e.g., posts) are being received from, and where viewpoints are focused.

In one or more embodiments, a viewpoint is a graphical representation of social mapping data displayed on a client device. A viewpoint may show an area of a map encompassing 100 meters, 1000, meters, 10 km, etc. In one or more embodiments a viewpoint may be based on a type of area shown on a map. For example, a viewpoint may be of a smaller area (e.g., a relatively smaller area of a map is shown on a display) if the area is an urban environment and/or includes many locations associated with posts, or a viewpoint may be of a larger area (e.g., a relatively larger area of a map is shown on a display) if the area is a rural environment. The same may be applicable to areas where a threshold amount of posts (e.g., social mapping data) are located regardless of a type of an area represented on a map.

In addition to a social mapping module 906 and a viewpoint generation module 905, system 900 may include a communication means which can transmit and/or receive information to/from a client device, a network, a multi-tenant network (e.g., the cloud), a network interface controller, a network gateway, etc.

In one or more embodiments, a client device may submit a post to data store 902. Such a post may include a graphical symbol received by a client device. The post may be based on one or more of a user profile, an atlas, a channel, a layer, and/or a post attribute. The post may be associated with an emotional state received by the client device, which may be represented by a color. In one or more embodiments, an emotional state may be represented as a value. For example, a user of a smartphone may provide input to smartphone causing the creation of a post, and the user may cause the smartphone to cause the post to be associated with a location, an emotional state value (e.g., where 0 is sad and 10 is happy, and where other numbers may represent angry, depressed, bored, etc.) and other things including, but not limited to: a store, a person, another user of the social network, an image, a video, audio, a time, a date, a symbol, a pictograph, an ideograph, an ideogram, a smiley, an emoji, an emoticon, an emoji bubble (e.g., a shape including/containing an emoji). In one or more embodiments, a user may not know an emotional state value. For example, a user may select an emotional state of sad without knowing that a system represents sad with a value such as 0. In one or more embodiments, emotional state values may be represented by both symbols and values.

In one or more embodiments, system 900 (which the social network may at least in part run on) may receive posts, which may be stored in data store 902 (along with user profiles, atlases, channels, layers, and/or post attributes, in some embodiments). System 900 (e.g., via social mapping module 906) may create a map and/or associate posts with locations on a map, which may then be transmitted to a client device and displayed on a screen of a client device. Based on input from a client device, system 900 (e.g., mapping module 906 and/or viewpoint generation module 905), which may be hosted remotely from a client device, may associate material to display on a client device including, but not limited to: at least a portion of a map, at least one or more posts which may be represented by one or more symbols, one or more colors representative of an attribute associated with a post (e.g., an emotion), an emoji, an emoji bubble, an image (e.g., of a location), a video (e.g., of the interior of a location, which may have been recorded within a particular period of time such as the previous hour), etc.

In some embodiments, users may be provided with a mode of posting providing the ability to tag symbols, emoji's, further enabling the ability to tag emotions (e.g., sentiment) and/or contextual cues (displayed in different formats such as color). In some embodiments, a user may be provided with a form which may be configured to create a post. The form may correspond with a user profile, an atlas, a channel, a layer, a social media post, and/or a post attribute. In addition to including/displaying post content (e.g., a post attribute) within a social media/online post, this information may also be displayed as the main mode of information transmittal, with word usage being secondary. Different contextual data sets may be combined into a single visualization for quick comprehension of the meaning of the posted data. These (e.g., the contextual data sets and/or visualizations) may include, but are not limited to: the tagging/inputting of emotional data using color, selecting symbols or "emojis" to visualize contextual information, by adding photos and/or multimedia, and/or tag/entering of questions on a map (e.g., such that another user of the social network may respond).

As described above, a system can be configured to pull these types of attributes together into a single data set visualized on the map. Each data set can be represented alone or concurrently with other data sets.

In one or more embodiments, screen attributes of a client device may be determined. Determining screen attributes of a client device may be performed at the client device or remote from the client device (e.g., at social mapping module 906 and/or viewpoint generation module 905). Screen attributes may include, but are not limited to: a size and shape of a screen, a current zoom level, a pan location, an availability of screen space, a viewing angle, an amount of transparency of a screen, and/or an amount of screen space. Further, screen attributes may be used to determine what is shown on a display, including, but not limited to: an amount of a map, a number of posts, a number of symbols representing posts, whether multiple posts/symbols should be represented by fewer (e.g., a single or a few) posts and/or symbols, a number of emojis, notifications associated with a social network, an amount of icons, types of illustrations, and/or a resolution of one or more displayed objects.

In one or more embodiments, transforming the visualization of content of a post dependent on a user's screen information can involve the following: a user's viewport or a user's desired viewpoint, a user's zoom level, a user's pan location (e.g., an area where they have moved their view above), and/or a user's screen dimensions.

In one or more embodiments, using this information to change the displayed post can include, but is not limited to: displaying indicators of total user activity variously as heat maps, dots, or other indications to show total amount activity, or all posts at any given time; showing, at a zoom level that is further out, an aggregate of user posts as a single bubble, and/or displaying a slideshow of user posts (e.g., multiple pictures and/or text) within or adjacent to that bubble. In this way, a system may act like a visual summarization of posted content at higher zoom levels. As another example of what happens when a user zooms in on a location, individual bubbles (or other types of posts) may convey a specific post from a user (which may be designated for a specific person or group of people). Further, in some embodiments a system may simply show only as many bubbles on screen at a given time based on a user's available screen space. This may prevent the overlap of posted information, making the system easier to use. In some embodiments user's may cycle through which post and/or channel to show and hide as the user's viewport changes. Further, a user's device may reveal hidden text, allowing those words to unfurl/become visible in response to screen real estate becoming available.

Methods discussed herein allow users to get an overall "gist" of total activity in a certain area. If bubbles popped up randomly, without showing the total activity in an area, users would be aware of information but never know the total aggregate of human or content activity in a specified area. This could be done by showing a heat map, or other visualization methods to show overall system activity. The platform may use dots, that even at their most minimum are colored, showing tagged emotional information.

In addition to, or instead of dots and heat maps, Emojis may populate a map to allow contextual information to be shown with little word usage. Emojis enable expression of social posts and bring context to posts without using words. When combined with bubble UI elements of the location-based content platform (and/or sentiment module and/or a mood expression system), as a whole it allows a user to communicate "what's happening", the emotion behind the thought. The system combines this symbolization selection with mood selectors to bring multiple emotional and contextual indicators into a post replacing the need for words, which are secondary.

As described herein, in one or more embodiments, the system finds the most relevant posts for a given (geographical) area and lists them in order of importance (e.g., gives them an importance value as compared to other posts). The system can then add those posts to a map in order of importance. If any post would fall on top of another post, then it may not be displayed or vanish. This ensures that only the most relevant posts are displayed and are never hidden or cluttered. The system determines what transformation effect to show (e.g., a fade out vs. an abrupt stop), which bubble items to show, and which form to show at any given time based on one or more attributes. Such attributes may include, but are not limited to: a number of votes a post has received, when the post was posted, how long ago, and/or how many comments the post has.

Integrating emotional or contextual cues and visualizing them as color or symbolization as part of a single post rather than using words may enhance a system's capabilities (comprehension) and space requirements over using words alone.

In some embodiments, posts may be plotted by relevancy (importance score order) which may be determined by:
1) finding all posts with in a view point; and
2) calculating their importance score.

Next, a system may plot them within the view point in their importance score order, and lower importance posts falling under/overlapping higher priority posts are not displayed.

In some embodiments, posts/dots shown on the map are state data shown in minimal form. These are viewable in all zoom levels to show the amount or level of activity in a region. These could be heat maps or other visualization methods showing the amount of total activity in an area.

Further, in some embodiments, a system may track one or more map regions presented to the user. Based on pan and zoom, it transforms the presentation of posts from an aggregated radar zoom to individual bubble UI elements, that pop up, showing state data as individual posts. Posts that are more important appear as higher priority bubble views. Captured and aggregated relevancy data can be used to calculate importance. Further, if a system determines that a user may want to be alerted about another area/location/event, the system may cause a display to move without the user's input. For example, a system may determine what a user may want to see based on a user's past history, similar users, or by using various machine learning techniques that become better as they are used more.

The system aggregates relevancy data to calculate a score (importance score) that determines which post appears first, analogous to the tallest trees getting most of the light.

This symbolization provides greater context using fewer words than Twitter's 140-word limit. Color provides "tagged" information. Animated unfurling of posts may show more data based on screen space. In some embodiments animated bubbles may pop in and out based on screen space, display information, and/or whether an event ended. This combines to enable a system to scale a massive amount of content data on screen at once without becoming overloaded even in a small space such as Manhattan, N.Y.

As can now be seen, what might at first might seem like arbitrary design display, is in fact, carefully developed functionality to fix the hard problem of displaying relevant data from a large set. This functionality allows for a relevant scalable social network on a map.

Without the popping in and out from the minimal dot form, using old style map pins, for example with respect to the amount of content in an area such as Manhattan, would quickly overflow a map causing it to become unreadable. See, for example, FIG. 3B.

Without the ability to tag state data and symbolization using color, users might only be able to use text to convey their feelings. Twitter's 140-character tweets wouldn't work on a map. Further, older aggregation techniques may lose the context of post at higher zoom levels.

All these functionalities in concert (e.g., the bubbles, which are able to appear and disappear based on location, the ability to attach supplemental emotional data using colors, the ability to visualize context using symbolization (emojis)) allow for advantageous transformations of a post, which in another context may simply show up on page 2 of a messaging board.

In one or more embodiments, post data (which may be used interchangeably with the term post attribute(s)) associated with a post may be displayed on at least one client device. Such post data (as discussed above) may include, but is not limited to: a time and/or date, text, images, videos, a shape connoting location information, information about an area of a map, related posts, a symbol associated with a post, an emoji, an emoji bubble, a color, a color associated with an emotion. In one or more embodiments, a post includes post data, which may be displayed on a client device based at least in part on the screen attributes. For example, a particular amount of posts may be shown on the screen of a client device based on the size of the screen (e.g., the display of the client device).

Figure 9B:
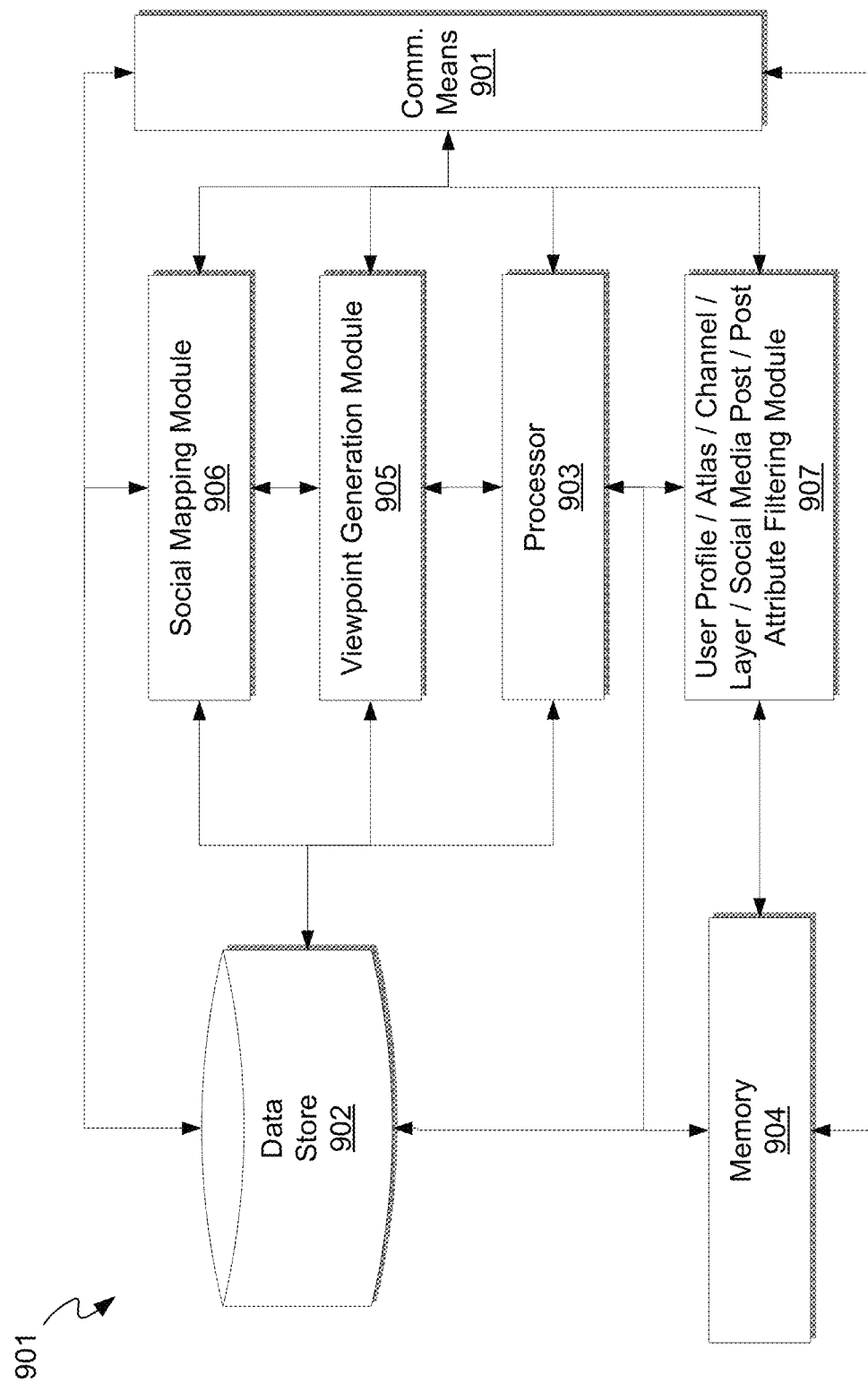

FIG. 9B illustrates system 901, which is similar to system 900 but further includes a user profile/atlas/channel/layer/social media post/post attribute filtering module 907. User profiles, atlases, channels, layers, social media posts, and post attributes are discussed above, and may be used to reduce and/or increase an amount of posts shown on a display (and may also be referred to as a filter). In one or more embodiments, a user profile, atlas, channel, and/or layer may include a set of posts (e.g., a user profile, atlas, channel, and/or layer may filter posts, which may be shown on the display of a client device). Such a set of posts may be related based on attributes of the user profile, atlas, channel, layer, and/or set of posts social media posts, including, but not limited to: a keyword, a tag linked to/associated with the channel/set of posts, a hashtag, a region, a city, a proximity, a common location, an event, a location, a type of location (e.g., a bar, a club, a deli, a sushi restaurant, a stadium, a park), a type of food, a set of social network connections (e.g., selecting a channel may cause posts from a particular set of network users to be displayed on a client device), posts comprising a certain weight (e.g., an amount of upvotes, an amount of downvotes, an aggregate amount of upvotes and downvotes, an amount of comments, an amount of upvotes of comments of a post, a user's preferences, a time associated with comments, and/or a time associated with the post(s). In one embodiment, a post may be based on a user profile, atlas, channel, and/or layer (e.g., a user may make a post to a certain user profile, atlas, channel, and/or layer), and the user profile, atlas, channel, and/or layer may include a set of posts.

Embodiments may be implemented on a specialized computer system. The specialized computing system can include one or more modified mobile devices (e.g., laptop computer, smart phone, wearables like a smart watch, personal digital assistant, tablet computer, or other mobile device), desktop computers, smart televisions, smart home appliances, electronic kiosk stands, smart automobiles, servers, blades in a server chassis, or any other type of computing device(s) that include at least the minimum processing power, memory, and input and output device(s) to perform one or more embodiments.

Figure 10:
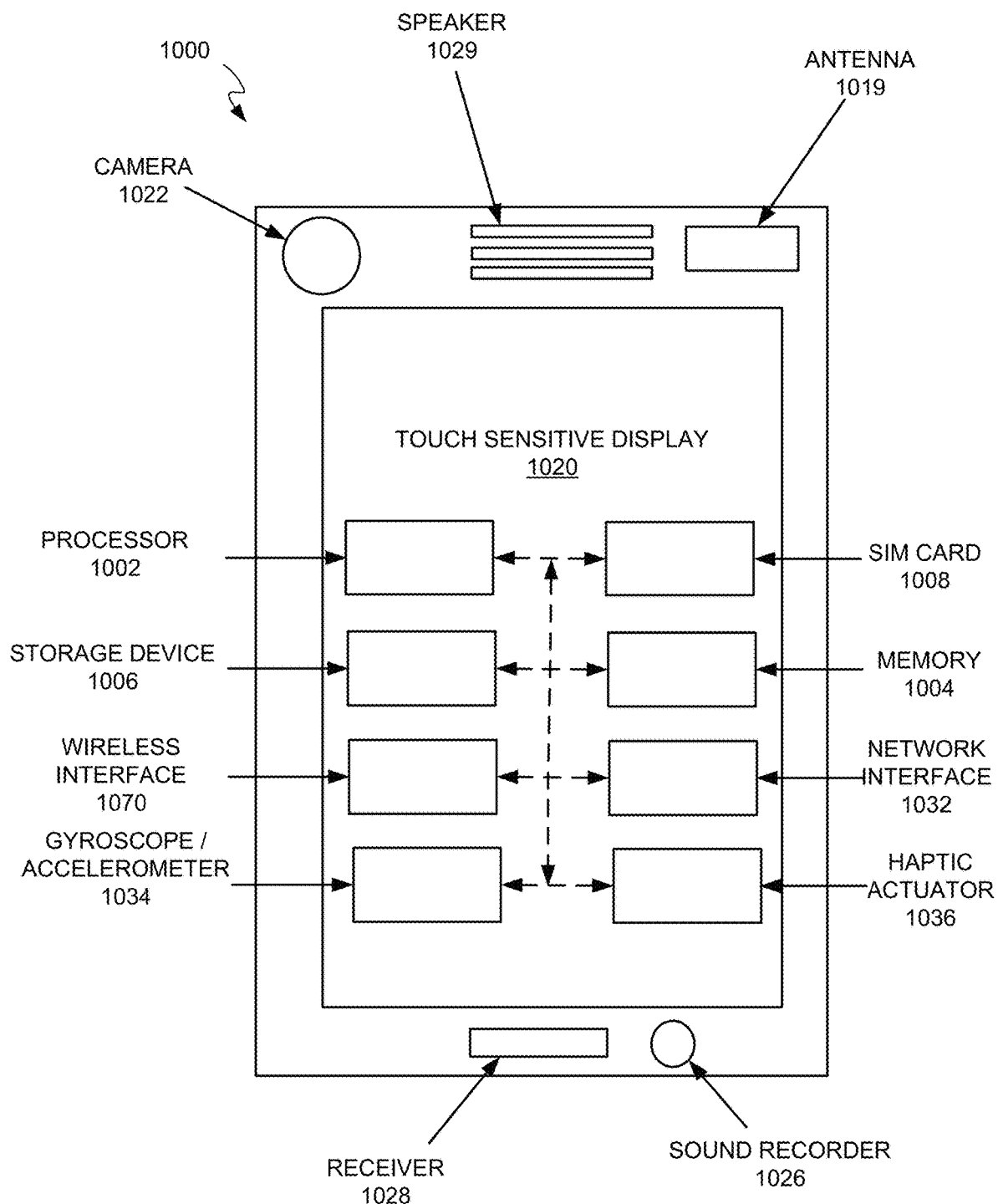
FIG. 10 illustrates an exemplary block diagram of a client device, in accordance with one or more embodiments of the invention.

Embodiments of the invention may be implemented on various mobile or non-mobile computing devices, regardless of the platform being used. In one or more embodiments of the invention, as depicted in FIG. 10, a mobile device 1000 can be used to create, receive, and/or transmit one or more sensory memes and/or, more generally, to implement one or more of the user interface related functionality disclosed herein. The mobile device 1000 may include any portable device that provides a user interface. Examples of mobile devices may include, but are not limited to, cellular phones, personal digital assistants, personal communicators, tablet computers, smartphones, or any other computing device. The mobile device 1000 can include one or more processor(s) 1002, memory 1004 (e.g., RAM, cache memory, flash memory, etc.), a storage device 1006 (e.g., a hard disk, a solid state drive, an optical drive such as a compact disk drive or digital video disk (DVD) drive, a flash memory stick, etc.), a subscriber identification module (SIM) card 1008, a speaker 1029, an antenna 1019, a wireless interface 1070, a network interface 1032 and numerous other elements and functionalities typical of mobile devices (not shown).

The mobile device 1000 may include input means and output means, such as the keyboard, the receiver 1028, and/or the touch sensitive display device (e.g., a touch liquid crystal display screen) 1020, which permits a user to perform gestures (e.g., drag, swipe, multi-touch, select, press and hold, etc.) and enter/display keystrokes (including numeric, alphabetic, and other characters, images, or other media types). Other input devices may include a camera 1022, a sound recorder 1026, and/or other data recording mechanism. Those skilled in the art will appreciate that these input and output means may take other forms now known or later developed. Using embodiments of the present invention, a consumer may initiate create, edit, and/or share a video vignette using the mobile device 1000.

The form factor and functionality of the mobile device 1000 can vary in accordance with various embodiments of the invention. For example, as discussed above, the mobile device 1000 can include one or more sensory devices (e.g., wearable electronics, biometric, optical, acoustic, mechanical, electrical, etc.) or any combination of devices configured to perform some or all of the functionality described with regard to system herein.

The mobile device 1000 may be connected to a network (e.g., a local area network (LAN), a wide area network (WAN) such as the Internet, or any other similar type of network) via the antenna 1019, wireless interface 1030, and/or network interface 1032. In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (1000) with a mobile device identifier of the mobile device 1000.

In one or more embodiments of the invention, the network connection may be facilitated by a hardwired or other similar connection using the network interface 1032. For example, the network connection may involve a hardwire connection or short-range wireless connectivity technology with a second mobile device, a printing mechanism, a scanner, or a recording system.

In one or more embodiments of the invention, the gyroscope/accelerometer 1034 and haptic actuator 1036 are examples of sensory devices embedded within the mobile device 1000 and usable in the creation and playback of one or more sensory memes.

Figure 11:
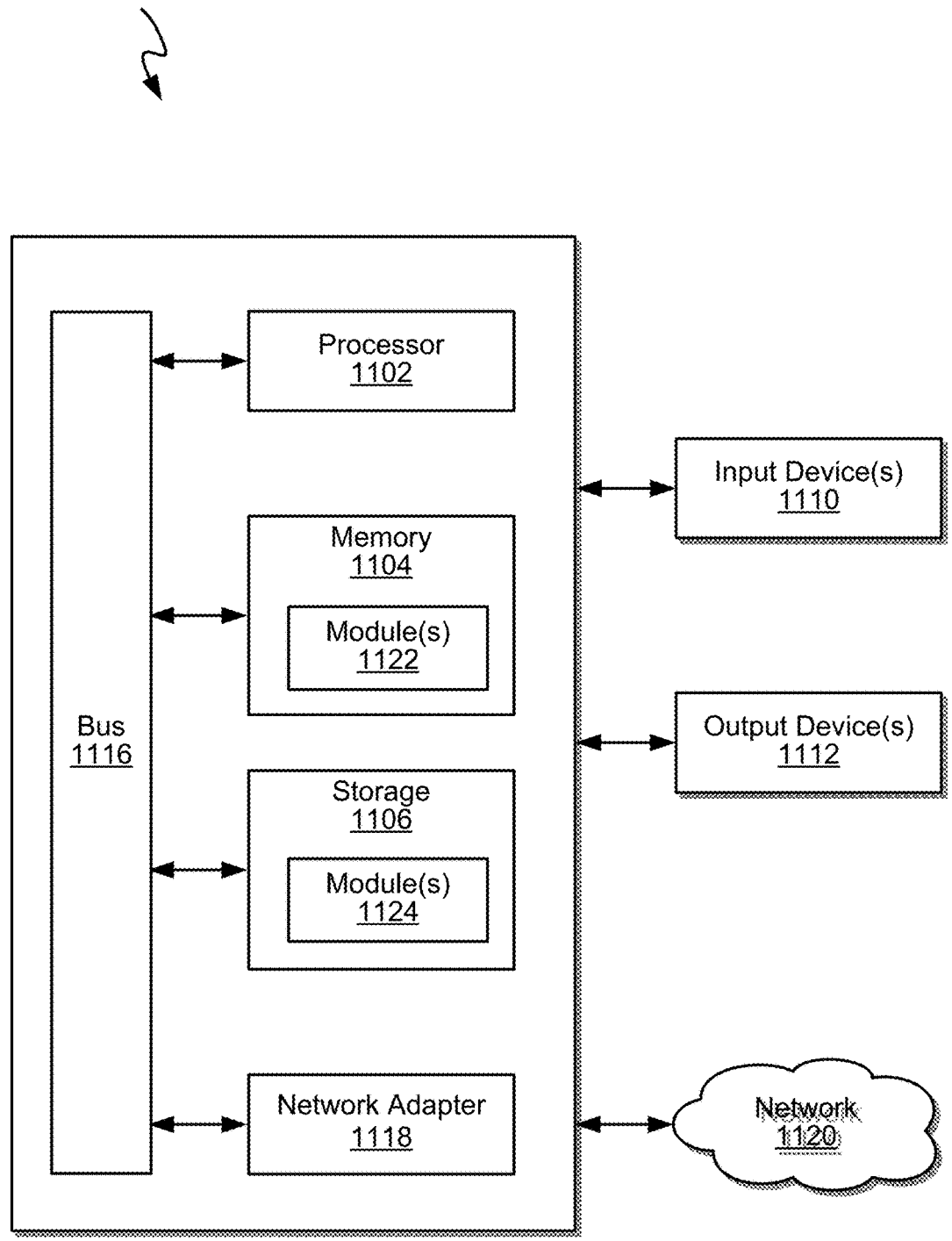
FIG. 11 illustrates an exemplary block diagram of a computing system, in accordance with one or more embodiments of the invention.

FIG. 11 illustrates a computing system 1100 which may include one or more computer processor(s) 1102, associated memory 1104 (e.g., random access memory (RAM), cache memory, flash memory, etc.), one or more storage device(s) 1106 (e.g., a hard disk, an optical drive such as a compact disk (CD) drive or digital versatile disk (DVD) drive, a flash memory stick, etc.), and numerous other elements and functionalities. The computer processor(s) 1102 may be an integrated circuit for processing instructions. For example, the computer processor(s) may be one or more cores or micro-cores of a processor. The computing system 1100 may also include one or more input device(s) 1110, such as a touchscreen, keyboard, mouse, microphone, touchpad, electronic pen, or any other type of input device. Further, the computing system 1100 may include one or more output device(s) 1108, such as a screen (e.g., a liquid crystal display (LCD), a plasma display, touchscreen, cathode ray tube (CRT) monitor, projector, or other display device), a printer, external storage, or any other output device. The computing system 1100 may be connected to a network 1114 (e.g., a local area network (LAN), a wide area network (WAN) such as the Internet, mobile network, or any other type of network) via a network interface connection 1118. The input and output device(s) may be locally or remotely connected (e.g., via the network 1112) to the computer processor(s) 1102, memory 1104, and storage device(s) 1106.

One or more elements of the aforementioned computing system 1106 may be located at a remote location and connected to the other elements over a network 1114. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1 and 2) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 9A and 9B) and/or flowcharts (e.g., FIG. 8). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A system for providing location information on a social network, comprising:
   a computer processor; and
   a social mapping module executing on the computer processor and configured to enable the computer processor to:
   define a first channel based at least on a first criterion associated with a first user account of the social network, wherein the first channel is defined based on a first set of geolocation data;
   define, based on a first set of social media posts, a first layer in the first channel;
   define a second channel based at least on a second criterion associated with a second use raccount of the social network, wherein the second channel is defined based on the first set of geolocation data or a second set of geolocation data;
   define, based on a second set of social media posts, a second layer in the second channel;
   receive, from a client device, a first transmission including a first selection of the first channel, wherein the first transmission includes an identification of a third user account of the social network logged into the client device, and wherein the third useraccount has no direct social connection to the first user account and the second user account within the social network;
   receive, from the client device, a second transmission including a second selection of the second channel, wherein the second transmission includes the identification of the third user account of the social network;
   apply, by the computer processor, a linking operation to link the first channel and the second channel to generate an aggregated channel, wherein the aggregated channel is configured to access the first layer and the second layer;
   receive, from the client device, a request for content from the aggregated channel, wherein the request comprises a screen attribute of the client device;
   identify, based on at least on the first criterion and the second criterion, a set of candidate social media posts from the aggregated channel;
   generate ranking scores for each of the set of candidate social media posts, wherein each ranking score is based on a general score representing general popularity and a customized score representing relevance to the third user account;
   identify, based on the ranking scores and the screen attribute, a subset of the candidate social media posts for inclusion in a result set; and
   transmit to the client device, in response to the request, the result set comprising the subset of the candidate social media posts from the aggregated channel for display by the client device, and cause the client device to display the subset of the candidate social media posts aggregated into one or more symbols and one or more symbol sizes based on the ranking scores and the screen attribute of the client device.

2. The system of claim 1, wherein providing the aggregated channel for display by the client device includes providing the first layer accessed by the first channel and the first set of social media posts included in the first layer, and providing the second layer accessed by the second channel and the second set of social media posts included in the second layer.

3. The system of claim 1, wherein subsequent changes to the first channel and the second channel are represented in the aggregated channel.

4. The system of claim 1, wherein the social mapping module executing on the computer processor is further configured to enable the computer processor to remove duplicate social media posts from the aggregated channel for display by the client device.

5. The system of claim 1, wherein the social mapping module executing on the computer processor is further configured to enable the computer processor to:
   receive, from the client device, a third selection of a third channel, wherein the third channel is configured to access a third layer, and wherein the third layer includes a third set of social media posts; and
   apply, by the computer processor, a linking operation to link the aggregated channel and the third channel to update the aggregated channel.

6. The system of claim 1, wherein the third user account created the first channel and the second channel.

7. The system of claim 1, wherein a portion of the subset of candidate social media posts are included in both the first set of social media posts and the second set of social media posts.

8. A method for displaying portions of a social network, comprising:
   defining a first channel based at least on a first criterion associated with a first user account of the social network, wherein the first channel is defined based on a first set of geolocation data;
   defining, based on a first set of social media posts, a first layer in the first channel;
   defining a second channel based at least on a second criterion associated with a second user account of the social network, wherein the second channel is defined based on the first set of geolocation data or a second set of geolocation data;
   defining, based on a second set of social media posts, a second layerin the second channel;
   receiving, from a client device, a first transmission including a first selection of the first channel, wherein the first transmission includes an identification of a third user account of the social network logged into the client device, and wherein the third user account has no direct social connection to the first user account and the second user account within the social network;
   receiving, from the client device, a second transmission including a second selection of the second channel, wherein the second transmission includes the identification of the third user account of the social network;
   applying, by a computer processor, a linking operation to link the first channel and the second channel to generate an aggregated channel, wherein the aggregated channel is configured to access the first layer and the second layer;
   receiving, from the client device, a request for content from the aggregated channel, wherein the request comprises a screen attribute of the client device;
   identifying, based on at least on the first criterion and the second criterion, a set of candidate social media posts from the aggregated channel;
   generating ranking scores for each of the set of candidate social media posts, wherein each ranking score is based on a general score representing general popularity and a customized score representing relevance to the third user account;

identifying, based on the ranking scores and the screen attribute, a subset of the candidate social media posts for inclusion in a result set; and transmitting to the client device, in response to the request, the result set comprising the subset of the candidate social media posts from the aggregated channel for display by the client device, and cause the client device to display the subset of the candidate social media posts aggregated into one or more symbols and one or more symbol sizes based on the ranking scores and the screen attribute of the client device.

9. The method of claim 8, wherein providing the aggregated channel for display by the client device includes providing the first layer accessed by the first channel and the first set of social media posts included in the first layer, and providing the second layer accessed by the second channel and the second set of social media posts included in the second layer.

10. The method of claim 8, wherein subsequent changes to the first channel and the second channel are represented in the aggregated channel.

11. The method of claim 8, further comprising:
removing duplicate social media posts from the aggregated channel for display by the client device.

12. The method of claim 8, further comprising:
receiving, from the client device, a third selection of a third channel, wherein the third channel is configured to access a third layer, and wherein the third layer includes a third set of social media posts; and
applying, by the computer processor, a linking operation to link the aggregated channel and the third channel to update the aggregated channel.

13. The method of claim 8, wherein the third user account created the first channel and the second channel.

14. The method of claim 8, wherein a portion of the subset of candidate social media posts are included in both the first set of social media posts and the second set of social media posts.

15. A non-transitory computer-readable storage medium comprising a plurality of instructions for providing location information on a social network, the instructions configured to execute on at least one computer processor to enable the computer processor to:
define a first channel based at least on a first criterion associated with a first user account of the social network, wherein the first channel is defined based on a first set of geolocation data;
define, based on a first set of social media posts, a first layer in the first channel;
define a second channel based at least on a second criterion associated with a second user account of the social network, wherein the second channel is defined based on the first set of geolocation data or a second set of geolocation data;
define, based on a second set of social media posts, a second layer in the second channel;
receive, from a client device, a first transmission including a first selection of the first channel, wherein the first transmission includes an identification of a third user account of the social network logged into the client device, and wherein the third user account has no direct social connection to the first user account and the second user account within the social network;

receive, from the client device, a second transmission including a second selection of the second channel, wherein the second transmission includes the identification of the third user account of the social network;

apply, by the computer processor, a linking operation to link the first channel and the second channel to generate an aggregated channel, wherein the aggregated channel is configured to access the first layer and the second layer;

receive, from the client device, a request for content from the aggregated channel, wherein the request comprises a screen attribute of the client device;

identify, based on at least on the first criterion and the second criterion, a set of candidate social media posts from the aggregated channel;

generate ranking scores for each of the set of candidate social media posts, wherein each ranking score is based on a general score representing general popularity and a customized score representing relevance to the third user account;

identify, based on the ranking scores and the screen attribute, a subset of the candidate social media posts for inclusion in a result set; and provide transmit to the client device, in response to the request, the result set comprising the subset of the candidate social media posts from the aggregated channel for display by the client device, and cause the client device to display the subset of the candidate social media posts aggregated into one or more symbols and one or more symbol sizes based on the ranking scores and the screen attribute of the client device.

16. The non-transitory computer-readable storage medium of claim 15, wherein providing the aggregated channel for display by the client device includes providing the first layer accessed by the first channel and the first set of social media posts included in the first layer, and providing the second layer accessed by the second channel and the second set of social media posts included in the second layer.

17. The non-transitory computer-readable storage medium of claim 15, wherein subsequent changes to the first channel and the second channel are represented in the aggregated channel.

18. The non-transitory computer-readable storage medium of claim 15, wherein the plurality of instructions are further configured to enable the computer processor to remove duplicate social media posts from the aggregated channel for display by the client device.

19. The non-transitory computer-readable storage medium of claim 15, wherein the plurality of instructions are further configured to enable the computer processor to:
receive, from the client device, a third selection of a third channel, wherein the third channel is configured to access a third layer, and wherein the third layer includes a third set of social media posts; and
apply, by the computer processor, a linking operation to link the aggregated channel and the third channel to update the aggregated channel.

20. The non-transitory computer-readable storage medium of claim 15, wherein the third user account created the first channel and the second channel.

* * * * *

UNITED STATES PATENT AND TRADEMARK OFFICE
CERTIFICATE OF CORRECTION

| | |
|---|---|
| PATENT NO. | : 11,265,687 B2 |
| APPLICATION NO. | : 16/172692 |
| DATED | : February 19, 2019 |
| INVENTOR(S) | : Stephen Constantinides |

It is certified that error appears in the above-identified patent and that said Letters Patent is hereby corrected as shown below:

On the Title Page

(71) Applicant should read: You Map Inc., New York, NY (US)

Signed and Sealed this
Fourteenth Day of June, 2022

*Katherine Kelly Vidal*

Katherine Kelly Vidal
*Director of the United States Patent and Trademark Office*